(12) United States Patent
Yang et al.

(10) Patent No.: US 11,445,418 B2
(45) Date of Patent: *Sep. 13, 2022

(54) RESOURCE PROCESSING METHOD, APPARATUS, AND SYSTEM

(71) Applicant: VIVO MOBILE COMMUNICATION CO., LTD., Guangdong (CN)

(72) Inventors: Yu Yang, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,725

(22) Filed: Nov. 10, 2020

(65) Prior Publication Data

US 2021/0068015 A1 Mar. 4, 2021

Related U.S. Application Data

(63) Continuation of application No. PCT/CN2019/085814, filed on May 7, 2019.

(30) Foreign Application Priority Data

May 11, 2018 (CN) .......................... 201810450841.0

(51) Int. Cl.
*H04W 36/04* (2009.01)
*H04L 5/00* (2006.01)
(Continued)

(52) U.S. Cl.
CPC .......... *H04W 36/04* (2013.01); *H04B 7/0626* (2013.01); *H04L 5/0048* (2013.01);
(Continued)

(58) Field of Classification Search
CPC ..... H04W 36/04; H04W 36/06; H04W 24/10; H04W 72/042; H04W 72/0446;
(Continued)

(56) References Cited

U.S. PATENT DOCUMENTS 10,701,734 B2* 6/2020 Shih ...................... H04W 72/02
10,813,137 B2* 10/2020 Shih ................... H04W 74/0833
(Continued)

FOREIGN PATENT DOCUMENTS

CN 103580810 A 2/2014
CN 104798321 A 7/2015
(Continued)

OTHER PUBLICATIONS

MediaTek Inc., "Remaining Details on Bandwidth Part Operation in NR," 3GPP TSG RAN WG1 Meeting 90bis, R1-1718327, pp. 1-13, (Oct. 8, 2017).
(Continued)

*Primary Examiner* — Siu M Lee
(74) *Attorney, Agent, or Firm* — Maschoff Brennan

(57) ABSTRACT

A resource processing method, an apparatus, and a system are disclosed. The resource processing method comprises: receiving, by UE, first signaling from a base station, wherein the first signaling is used to instruct to deactivate a first cell that provides a service for the UE, or used to instruct the UE to switch from a source bandwidth part (BWP) to a target BWP; and processing, by a media access control (MAC) entity in the UE, a first target resource by using a first target processing manner, wherein the first target resource is a resource in the first cell or the source BWP.

9 Claims, 11 Drawing Sheets

(51) Int. Cl.
*H04W 24/10* (2009.01)
*H04B 7/06* (2006.01)
*H04W 72/04* (2009.01)
*H04W 80/02* (2009.01)

(52) U.S. Cl.
CPC .......... *H04L 5/0051* (2013.01); *H04L 5/0092* (2013.01); *H04L 5/0098* (2013.01); *H04W 24/10* (2013.01); *H04W 72/042* (2013.01); *H04W 72/0446* (2013.01); *H04W 80/02* (2013.01)

(58) Field of Classification Search
CPC . H04W 72/0453; H04W 80/02; H04W 28/26; H04B 7/0626; H04L 5/001; H04L 5/0044; H04L 5/0048; H04L 5/005; H04L 5/0051; H04L 5/0057; H04L 5/0073; H04L 5/0092; H04L 5/0098
See application file for complete search history.

(56) References Cited

U.S. PATENT DOCUMENTS

| | | | |
|---|---|---|---|
| 10,897,399 B2* | 1/2021 | Jin | H04W 36/0077 |
| 10,985,894 B2* | 4/2021 | Loehr | H04W 80/02 |
| 11,166,317 B2* | 11/2021 | Agiwal | H04L 5/0098 |
| 2013/0077513 A1 | 3/2013 | Ng et al. | |
| 2015/0180684 A1 | 6/2015 | Chen et al. | |
| 2015/0282036 A1 | 10/2015 | Yi et al. | |
| 2017/0245165 A1 | 8/2017 | Onggosanusi et al. | |
| 2017/0311339 A1 | 10/2017 | Xu et al. | |
| 2019/0319120 A1* | 10/2019 | Chang | H01L 21/32133 |
| 2019/0349120 A1* | 11/2019 | Cheng | H04L 5/0078 |
| 2020/0228287 A1 | 7/2020 | Lou et al. | |
| 2021/0067221 A1* | 3/2021 | Yang | H04L 5/0051 |

FOREIGN PATENT DOCUMENTS

| | | |
|---|---|---|
| CN | 105659655 A | 6/2016 |
| EP | 3 029 848 A1 | 6/2016 |
| EP | 3709701 A1 | 9/2020 |
| JP | 2014-534667 A | 12/2014 |
| JP | 2020-535761 A | 12/2020 |
| WO | 2014/019168 A1 | 2/2014 |
| WO | 2016/121637 A1 | 8/2016 |
| WO | 2019/62837 A1 | 4/2019 |

OTHER PUBLICATIONS

LG Electronics, "Remaining issues on bandwidth part operation," 3GPP TSG RAN WG1 Meeting #92, R1-1802216, pp. 1-5, (Feb. 16, 2018).
Extended European Search Report dated Apr. 20, 2021 as received in Application No. 20216057.8.
Extended European Search Report dated May 18, 2021 as received in Application No. 19800847.6.
CN Office Action in Application No. 201810450841.0 dated May 6, 2020.
CN Search Report in Application No. 201810450841.0 dated Apr. 2, 2020.
"Remaining issues on CSI measurement" ZTE, Sanechips, 3GPP TSG RAN WG1 Meeting #92bis, R1-1803907, Apr. 16, 2018.
"Remaining issues on CSI reporting" Ericsson, 3GPP TSG RAN WG1 Meeting #92bis, R1-1804973, Apr. 16, 2018.
"Introduction of MAC CEs for NR MIMO" Change Request, Nokia, Nokia Shanghai Bell, 3GPP TSG-RAN WG2 #101, R2-1803796, Feb. 26, 2018.
Written Opinion and International Search Report in Application No. PCT/CN2019/085814 dated Nov. 26, 2020.
3rd Generation Partnership Project, "Technical Specification Group Radio Access Network," 3GPP TS 38.214, p. 1-40, (Mar. 2018).
NTT DOCOMO, "Remaining issues on CSI reporting," 3GPP TSG RAN WG1 Meeting #92b, R1-1805040, pp. 1-14, (Apr. 2018).
JP Office Action dated Dec. 6, 2021 as received in Application No. 2021-512988.
Non Final Office Action dated Mar. 8, 2022 as received in U.S. Appl. No. 17/094,717.

* cited by examiner

RESOURCE PROCESSING METHOD, APPARATUS, AND SYSTEM

CROSS-REFERENCE TO RELATED APPLICATIONS

This application is a continuation application of PCT Application No. PCT/CN2019/085814 filed on May 7, 2019, which claims priority to Chinese Patent Application No. 201810450841.0, filed in China on May 11, 2018, disclosure of which are incorporated herein by reference in their entireties.

TECHNICAL FIELD

Embodiments of this disclosure relate to the communications field, and in particular, to a resource processing method, an apparatus, and a system.

BACKGROUND

In a communications system, user equipment (UE) may send a channel state information (CSI) report to a base station, so that the base station can obtain CSI based on the CSI report and schedule the UE based on the CSI.

Usually, the base station may configure a reference signal resource (for example, a CSI reference signal (CSI-RS) resource) for the UE or indicate a reference signal resource to the UE, so that the UE performs CSI measurement. After the UE obtains the reference signal resource configured or indicated by the base station, the UE may allocate a CSI processing unit to the reference signal resource, so that the UE performs a measurement process on the reference signal resource. After measuring the reference signal resource, the CSI processing unit may process (for example, calculate or analyze) a measurement result and generate a CSI report based on a processed result, and then the UE sends the CSI report to the base station.

However, when a cell on which the UE camps is deactivated, or a bandwidth part (BWP) in which the UE works is switched, according to the foregoing process, on one hand, because an occupied CSI processing unit can perform a measurement process only on a reference signal resource associated with a CSI report corresponding to the CSI processing unit, the CSI processing unit cannot perform a measurement process on other reference signal resources; on the other hand, because other resources related to this measurement process can be used only in this measurement process, these resources cannot be used in other processes. Therefore, resources (including the foregoing CSI processing unit and other resources) in the measurement process of the UE are wasted, and utilization of the resources in the measurement process of the UE is reduced.

SUMMARY

According to a first aspect, an embodiment of this disclosure provides a resource processing method. The method may include: receiving, by UE, first signaling from a base station, where the first signaling is used to instruct to deactivate a first cell that provides a service for the UE, or used to instruct the UE to switch from a source BWP to a target BWP; and processing, by a MAC entity in the UE, a first target resource by using a first target processing manner, where the first target resource is a resource in the first cell or the source BWP.

According to a second aspect, an embodiment of this disclosure provides UE. The UE includes a processor, a memory, and a computer program stored in the memory and capable of running on the processor. When the computer program is executed by the processor, the UE implements steps of the resource processing method in the first aspect.

According to a third aspect, an embodiment of this disclosure provides a non-transitory computer-readable storage medium. The non-transitory computer-readable storage medium stores a computer program, and the computer program is configured to be executed by a processor to cause UE to implement steps of the resource processing method in the first aspect.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may still derive other drawings from these accompanying drawings without creative efforts.

DESCRIPTION OF EMBODIMENTS

Figure 1:
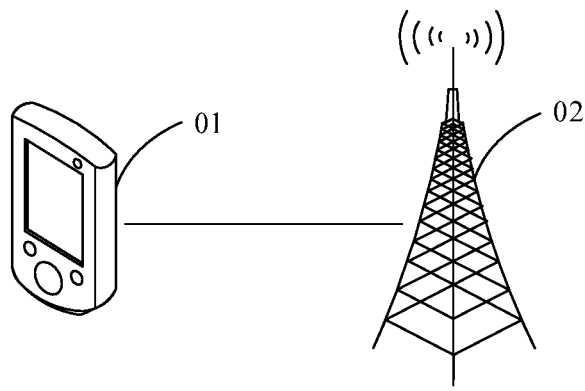
FIG. 1 is a schematic architectural diagram of a communications system according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

In the specification and claims of this disclosure, the terms "first" and "second" are used to distinguish between different objects, and are not used to describe a specific sequence of the objects. For example, a first processing manner and a second processing manner are used to distinguish between different processing manners, and are not used to describe a specific sequence of the processing manners. In the description of the embodiments of this disclosure, unless otherwise specified, "a plurality of" means two or more than two.

The term "and/or" in this specification describes an association relationship for describing associated objects and represents that three relationships may exist. For example, A and/or B may represent the following three cases: Only A exists, both A and B exist, and only B exists. The character "/" in this specification indicates an "or" relationship between the associated objects. For example, A/B indicates A or B.

In the embodiments of this disclosure, terms such as "exemplarily" or "for example" are used to represent examples, illustrations, or explanations. Any embodiment or design solution described as "exemplarily" or "for example" in the embodiments of this disclosure shall not be interpreted to be more preferential or advantageous than other embodiments or design solutions. Specifically, the terms such as "exemplarily" or "for example" are intended to present related concepts in a specific manner.

The following describes some concepts and/or terms used in a method for processing a CSI processing unit, a resource processing method, an apparatus, and a system provided in the embodiments of this disclosure.

CSI: namely channel state information. The CSI may include at least one of a channel quality indicator (CQI), a precoding matrix indicator (PMI), a CSI-RS resource indicator (CRI), a layer indicator (LI), a rank indicator (RI), and L1-reference signal received power (RSRP).

Periodic CSI report: It may refer to a CSI report periodically sent by UE to a base station. Specifically, a radio resource control (RRC) layer may configure parameters (for example, a period, a slot offset, and a symbol in a slot) of a periodic CSI report, and then the UE may transmit the periodic CSI report based on the parameters of the periodic CSI report by using an uplink control channel (for example, a long/short physical uplink control channel (PUCCH).

Aperiodic CSI report: It may refer to a CSI report sent by the UE to the base station based on an indication of the base station (for example, when receiving indication information sent by the base station). Specifically, the RRC layer may configure parameters (for example, a slot offset and a symbol in a slot) of an aperiodic CSI report, and then after the UE receives downlink control information (DCI) sent by the base station, the UE transmits the CSI report by using an uplink data channel (for example, a physical uplink shared channel (PUSCH)). For example, the CSI report may include reports on a plurality of component carriers and a plurality of types of reports (beam measurement report and CSI measurement report).

Semi-persistent CSI report: After the RRC layer configures parameters (for example, a period, a slot offset, and a symbol in a slot) of a semi-persistent CSI report, the UE may send the semi-persistent CSI report based on an indication (for example, activation or deactivation) of MAC CE signaling by using an uplink control channel; and/or after the UE receives DCI sent by the base station, the UE may send the semi-persistent CSI report by using an uplink data channel.

Bandwidth part (BWP): A cell served by the base station supports a large bandwidth (hereinafter referred to as the large bandwidth), but the UE may work in a plurality of small bandwidth parts (hereinafter referred to as the small bandwidth parts). A small bandwidth part in which UE within the large bandwidth can work is referred to as a BWP. Each BWP corresponds to a Numerology, a bandwidth, a frequency location (frequency location), and the like. Each BWP may include three control resource sets (CORESETs).

In the embodiments of this disclosure, it may be understand that a cell and a carrier are a same concept. Specifically, a carrier may be a carrier corresponding to a cell. For example, activating a cell may be understood as activating a carrier corresponding to the cell, and deactivating a cell may be understood as deactivating a carrier corresponding to the cell.

The embodiments of this disclosure provide a method for processing a CSI processing unit, a resource processing method, an apparatus, and a system. After UE receives first signaling sent by a base station, when target information (the target information includes at least the first signaling) satisfies a preset condition, the UE may process a first CSI processing unit by using a first processing manner corresponding to the target information. When performing a measurement process, the UE may determine different first processing manners based on different target information. Therefore, for different target information, the UE can process the first CSI processing unit by using different first processing manners, that is, the UE can control usage of the first CSI processing unit based on an actual requirement. Therefore, waste of CSI processing units in the measurement process of the UE can be reduced, and utilization of the CSI processing units in the measurement process of the UE can be increased.

In addition, after the UE receives first signaling sent by the base station, the UE may process a first target resource by using a first target processing manner. When performing a measurement process, the UE may process the first target resource by using different first target processing manners. Therefore, the UE can control usage of resources based on an actual requirement. Therefore, waste of resources in the measurement process of the UE can be reduced, and utilization of the resources in the measurement process of the UE can be increased.

The method for processing a CSI processing unit, the resource processing method, the apparatus, and the system provided in the embodiments of this disclosure may be applied to a communications system, and specifically, may be applied to resource processing in the measurement process of the UE based on the communications system.

For example, FIG. 1 is a schematic architectural diagram of a communications system according to an embodiment of this disclosure. As shown in FIG. 1, the communications system may include UE 01 and a base station 02. A connection may be established between the UE 01 and the base station 02.

It should be noted that in this embodiment of this disclosure, the connection between the UE 01 and the base station 02 shown in FIG. 1 may be a wireless connection. To indicate a connection relationship between the UE 01 and the base station 02 more clearly, a solid line is used in FIG. 1 to indicate the connection relationship between the UE 01 and the base station 02.

The UE is a device that provides a user with voice and/or data connectivity, for example, a handheld device with a wired or wireless connection function, or another processing device connected to a wireless modem. The UE may communicate with one or more core network devices by using a radio access network (RAN). The UE may be a mobile terminal, for example, a mobile phone (or referred to as a "cellular" phone) and a computer having a mobile terminal, or may be a portable, pocket-sized, handheld, computer built-in, or in-vehicle mobile apparatus, which exchanges voice and/or data with the RAN. For example, the UE is a device such as a personal communication service (PCS) phone, a cordless telephone set, a Session Initiation Protocol (SIP) phone, a wireless local loop (WLL) station, or a personal digital assistant (PDA). The UE may also be referred to as a user agent, a terminal device, or the like.

The base station is an apparatus deployed in the RAN and configured to provide a wireless communication function for the UE. The base station may include a macro base station, a micro base station, a relay station, an access point, and the like in various forms. A device with a base station function may have different names in systems using different radio access technologies. For example, the device is referred to as a NodeB in a third generation mobile communications (3G) network, or referred to as an evolved NodeB (eNB or eNodeB) in an LTE system. With evolution of communications technologies, the name "base station" may change.

The method for processing a CSI processing unit, the resource processing method, the apparatus, and the system provided in the embodiments of this disclosure are hereinafter described in detail with reference to the accompanying drawings by using specific embodiments and application scenarios thereof.

It should be noted that the method for processing a CSI processing unit and the resource processing method provided in the embodiments of this disclosure are hereinafter separately described in detail by using two specific embodiments (that is, Embodiment 1 and Embodiment 2).

Embodiment 1

Figure 2:
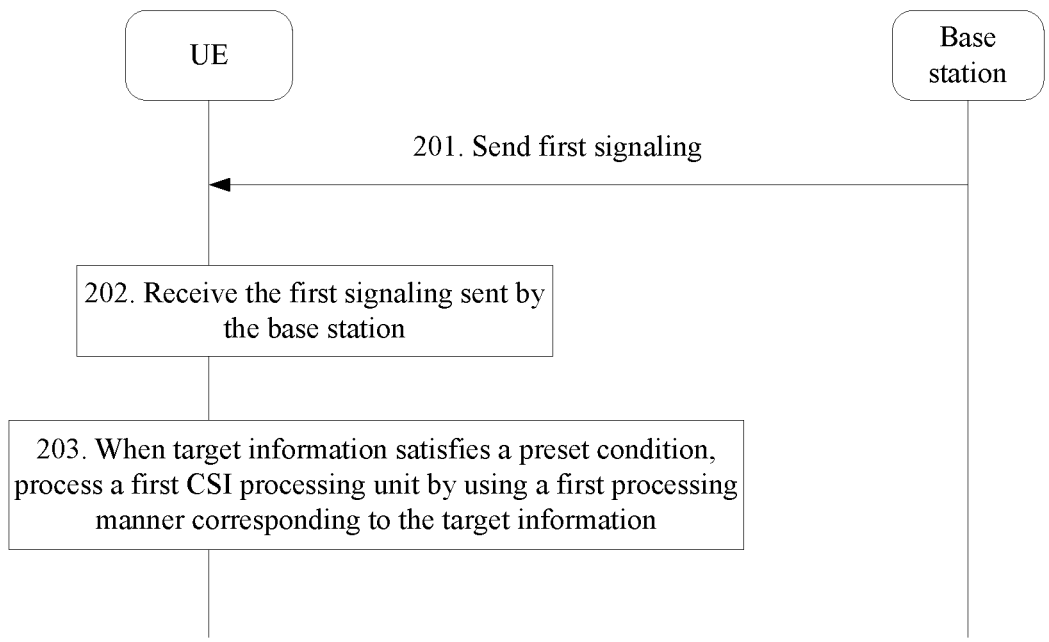
FIG. 2 is a first schematic diagram of a method for processing a CSI processing unit according to an embodiment of this disclosure.

Based on the communications system shown in FIG. 1, this embodiment of this disclosure provides a method for processing a CSI processing unit. As shown in FIG. 2, the method for processing a CSI processing unit may include the following step 201 to step 203.

Step 201: A base station sends first signaling to UE.

In this embodiment of this disclosure, the first signaling may be used to instruct to deactivate a first cell that provides a service for the UE, or used to instruct the UE to switch from a source BWP to a target BWP.

In this embodiment of this disclosure, the first cell may be a cell that serves the UE.

Optionally, in this embodiment of this disclosure, the first signaling may be cell deactivation signaling or BWP switching signaling, where the cell deactivation signaling is used to instruct to deactivate the first cell, and the BWP switching signaling is used to instruct the UE to switch from the source BWP to the target BWP.

Optionally, in this embodiment of this disclosure, the BWP switching signaling may be used to instruct the UE to perform uplink BWP switching, or used to instruct the UE to perform downlink BWP switching, or used to instruct the UE to perform uplink BWP switching and downlink BWP switching. The BWP switching signaling used to instruct the UE to perform uplink BWP switching may be applied to a frequency division duplex (FDD) system. The BWP switching signaling used to instruct the UE to perform downlink BWP switching may also be applied to the FDD system. The BWP switching signaling used to instruct the UE to perform uplink BWP switching and downlink BWP switching may be applied to a time division duplex (TDD) system.

Optionally, in this embodiment of this disclosure, when the base station detects great interference (for example, the interference is greater than a first preset threshold), poor signal quality (for example, signal strength is less than a second preset threshold), and/or no service of the UE within preset duration in the first cell, the base station may send the first signaling (for example, the cell deactivation signaling) to the UE, so that the base station and the UE deactivate the first cell.

Optionally, in this embodiment of this disclosure, the base station may send RRC signaling or DCI to the UE, to instruct the UE to switch from the source BWP to the target BWP, where the RRC signaling carries the first signaling (for example, the BWP switching signaling), and the DCI carries the first signaling (for example, the BWP switching signaling).

For example, the base station may send DCI carrying the BWP switching signaling to the UE, to instruct the UE to switch from the source BWP (for example, a first CORESET in the source BWP) to the target BWP (for example, a second CORESET in the target BWP).

It may be understood that before the UE switches from the first CORESET to the second CORESET, the source BWP in which the first CORESET is located is a BWP in an active state; and after the UE switches from the first CORESET to the second CORESET, the target BWP in which the second CORESET is located is a BWP in an active state.

Step 202: The UE receives the first signaling sent by the base station.

Step 203: When target information satisfies a preset condition, the UE processes a first CSI processing unit by using a first processing manner corresponding to the target information.

In this embodiment of this disclosure, the target information includes at least the first signaling, the first CSI processing unit is a CSI processing unit for measuring a first downlink reference signal resource, and the first downlink reference signal resource is a downlink reference signal resource in the first cell or the source BWP.

In this embodiment of this disclosure, in a measurement process of the UE, after the UE receives first signaling, the UE may determine the target information, and determine whether the target information satisfies the preset condition; and when the UE determines that the target information satisfies the preset condition, the UE may process the first CSI processing unit by using the first processing manner corresponding to the target information.

In this embodiment of this disclosure, after the UE receives the first signaling sent by the base station, the UE may determine the target information based on the first signaling.

Optionally, in this embodiment of this disclosure, the first downlink reference signal resource may be a downlink reference signal resource in the first cell, and the downlink reference signal resource in the first cell may include at least one of a channel state information-reference signal (CSI-RS) resource in the first cell, a channel state information-interference measurement (CSI-IM) resource in the first cell, a synchronization signal block (SSB) resource in the first cell, and a zero power (ZP) CSI-RS resource set in the first cell.

Optionally, in this embodiment of this disclosure, the first downlink reference signal resource may be a downlink reference signal resource in the source BWP, and the downlink reference signal resource in the source BWP may include at least one of a CSI-RS resource in the source BWP, a CSI-IM resource in the source BWP, an SSB resource in the source BWP, and a ZP CSI-RS resource set in the source BWP.

For example, the CSI-RS resource may be a semi-persistent CSI-RS resource, the CSI-IM resource may be a semi-persistent CSI-IM resource, and the ZP CSI-RS resource set may be a semi-persistent ZP CSI-RS resource set.

It should be noted that the target information and the target information satisfying the preset condition are described in detail in the following embodiment and not described herein.

It should be noted that in this embodiment of this disclosure, measuring the first downlink reference signal resource by the first CSI processing unit may be understood as performing a measurement process on the first downlink reference signal resource by the first CSI processing unit, where the measurement process may be that the first CSI processing unit measures the first downlink reference signal resource, processes (for example, calculates and analyzes) a measurement result, and then generates a CSI report based on a processed result.

In the method for processing a CSI processing unit according to this embodiment of this disclosure, after the UE receives the first signaling sent by the base station, when the target information (the target information includes at least the first signaling) satisfies the preset condition, the UE may process the first CSI processing unit by using the first processing manner corresponding to the target information. When performing the measurement process, the UE may determine different first processing manners based on different target information. Therefore, for different target information, the UE can process the first CSI processing unit by using different first processing manners, that is, the UE can control usage of the first CSI processing unit based on an actual requirement. Therefore, waste of CSI processing units in the measurement process of the UE can be reduced, and utilization of the CSI processing units in the measurement process of the UE can be increased.

Figure 3:
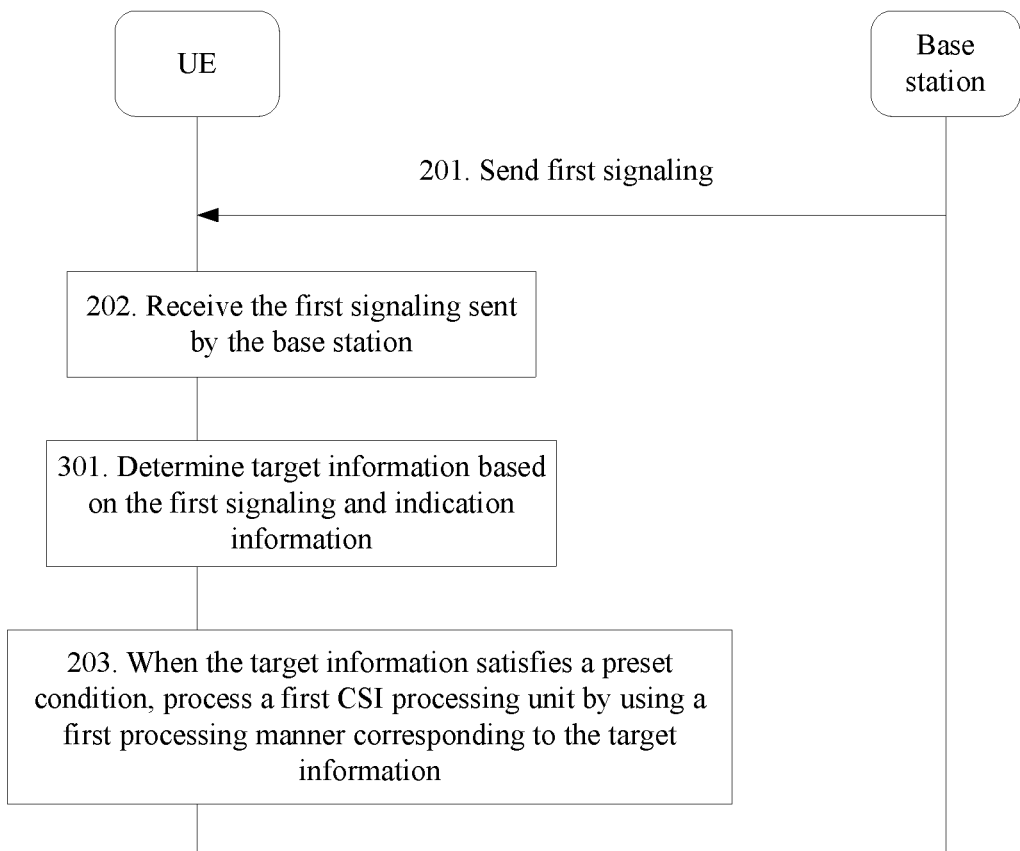
FIG. 3 is a second schematic diagram of a method for processing a CSI processing unit according to an embodiment of this disclosure.

Optionally, in this embodiment of this disclosure, with reference to FIG. 2, as shown in FIG. 3, after the foregoing step 202, the method for processing a CSI processing unit according to this embodiment of this disclosure may further include the following step 301.

Step 301: The UE determines the target information based on the first signaling and indication information.

In this embodiment of this disclosure, the indication information may be first information indicated by the base station to the UE, or the indication information may be first information and second information indicated by the base station to the UE, the first information is used to indicate a type of a CSI report sent by the UE to the base station, the second information is used to indicate an uplink channel for sending the CSI report to the base station by the UE, and the CSI report includes a result of measuring the first downlink reference signal resource by the first CSI processing unit.

Optionally, in this embodiment of this disclosure, the first information may be used to indicate the type of the CSI report sent by the UE to the base station, and the CSI report may include a type-1 CSI report and a type-2 CSI report.

It should be noted that in this embodiment of this disclosure, the UE may determine the type of the CSI report based on received time domain action information, where the time domain action information may be sent by the base station by using RRC signaling. A time domain action may be periodic, semi-persistent, or aperiodic. In addition, the time domain action information may further include periodic duration, an aperiodic slot offset, and the like.

Optionally, in this embodiment of this disclosure, the second information may be used to indicate the uplink channel for sending the CSI report to the base station by the UE, and the uplink channel may be a target uplink channel.

Optionally, in this embodiment of this disclosure, the result of measuring the first downlink reference signal resource, which is included in the CSI report, may include a CSI type, codebook configurations (including a codebook subset restriction configuration and a group-based reporting configuration), the time domain action information, frequency domain granularities of a CQI and a PMI (CSI report band and whether a PMI/CQI report falls within a wideband or a sub-band), measurement restriction configurations, a configuration of time domain restriction for channel measurement (time restriction for channel measurements, time domain restriction for channel measurements), a configuration of time domain restriction for interference measurement (time restriction for interference measurements, time domain restriction for interference measurement), an LI, L1-RSRP, CRI, a synchronization signal block resource indicator (SSBRI), and the like.

Optionally, in a possible implementation of in this embodiment of this disclosure, after the UE receives the first signaling sent by the base station, the UE may determine the first signaling as the target information.

Optionally, in this embodiment of this disclosure, in a case that the target information includes the first signaling, that the target information satisfies the preset condition is: the first signaling is type-1 signaling; and the UE may process the first CSI processing unit by using the first processing manner corresponding to the first signaling.

Figure 4:
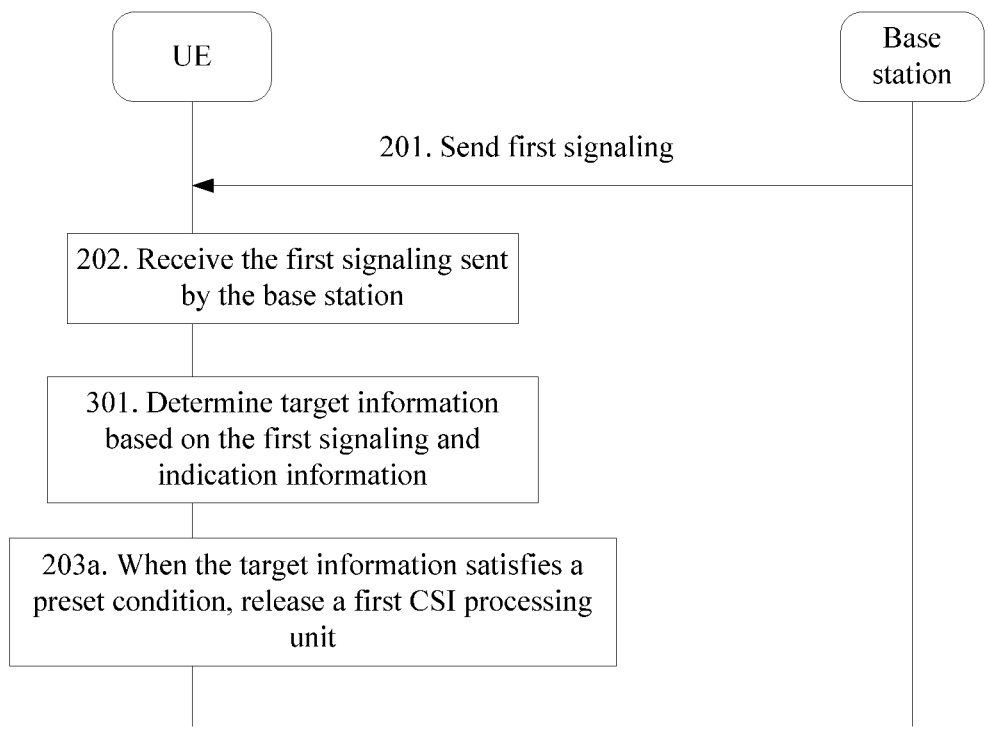
FIG. 4 is a third schematic diagram of a method for processing a CSI processing unit according to an embodiment of this disclosure.

Optionally, in this embodiment of this disclosure, in a case that the type-1 signaling is cell deactivation signaling, the first processing manner is releasing (clear/release) a CSI processing unit. With reference to FIG. 3, as shown in FIG. 4, the foregoing step 203 may be specifically implemented by the following step 203a.

Step 203a: When the target information satisfies the preset condition, the UE releases the first CSI processing unit.

In this embodiment of this disclosure, the first CSI processing unit in the foregoing step 203a is a CSI processing unit for measuring a downlink reference signal resource in the first cell.

In this embodiment of this disclosure, when the target information includes the first signaling, the first signaling is the type-1 signaling, and the type-1 signaling is the cell deactivation signaling, the UE may release the first CSI processing unit.

It should be noted that in this embodiment of this disclosure, releasing may be understood as non-occupying. For example, releasing the first CSI processing unit by the UE may be understood as no longer occupying the first CSI processing unit by the UE.

In this embodiment of this disclosure, when the target information includes the first signaling, the first signaling is the type-1 signaling, and the type-1 signaling is the cell deactivation signaling, the UE may release the first CSI processing unit. Therefore, waste of the first CSI processing unit in the measurement process of the UE can be reduced, and utilization of the first CSI processing unit in the measurement process of the UE can be increased.

Optionally, in another possible implementation of this embodiment of this disclosure, the UE may determine the target information based on the first signaling and the first information.

Optionally, in this embodiment of this disclosure, in a case that the target information includes the first signaling and the CSI report, that the target information satisfies the preset condition is: the first signaling is type-2 signaling, and the CSI report is the type-1 CSI report; and the UE may process the first CSI processing unit by using the first processing manner corresponding to the first signaling and the CSI report.

Figure 5:
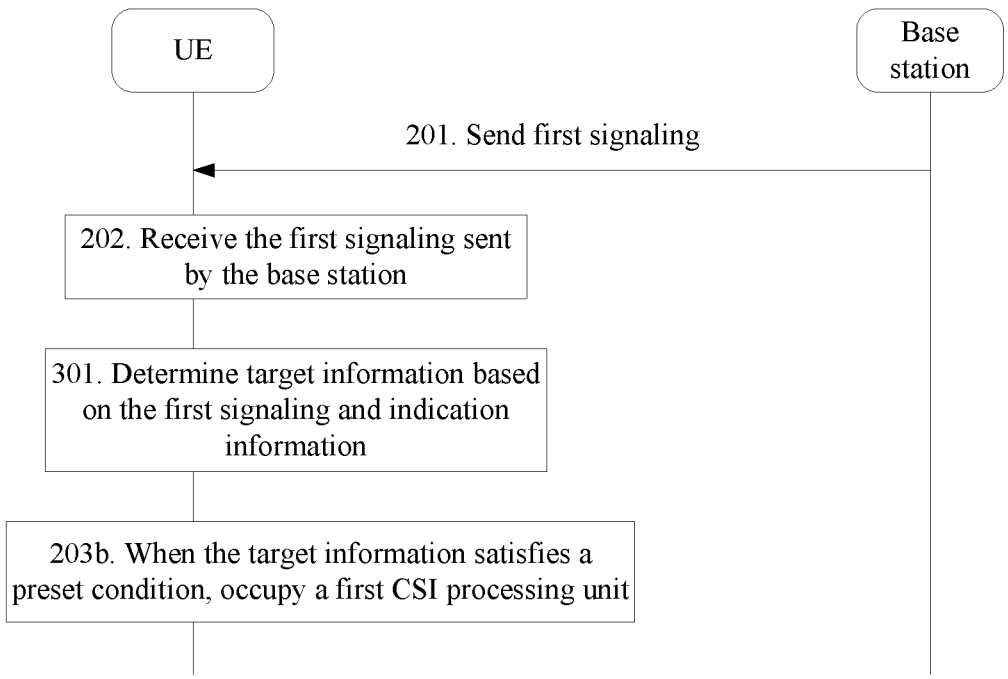
FIG. 5 is a fourth schematic diagram of a method for processing a CSI processing unit according to an embodiment of this disclosure.

Optionally, in this embodiment of this disclosure, in a case that the type-2 signaling is the BWP switching signaling, and the type-1 CSI report is a periodic CSI report or an aperiodic CSI report, the first processing manner is occupying a CSI processing unit. With reference to FIG. 3, as shown in FIG. 5, the foregoing step 203 may be specifically implemented by the following step 203b.

Step 203b: When the target information satisfies the preset condition, the UE occupies the first CSI processing unit.

In this embodiment of this disclosure, the first CSI processing unit in the foregoing step 203b is a CSI processing unit for measuring a downlink reference signal resource in the source BWP.

In this embodiment of this disclosure, when the target information includes the first signaling and the CSI report, and the first signaling is the type-2 signaling, and the CSI report is the type-1 CSI report, and the type-2 signaling is the BWP switching signaling, and the type-1 CSI report is the periodic CSI report or the aperiodic CSI report, the UE may occupy the first CSI processing unit.

It should be noted that for descriptions about the periodic CSI report or the aperiodic CSI report, reference may be made to the descriptions in the foregoing embodiments. Details are not described again herein.

In this embodiment of this disclosure, when the target information includes the first signaling and the CSI report, and the first signaling is the type-2 signaling, and the CSI report is the type-1 CSI report, and the type-2 signaling is the BWP switching signaling, and the type-1 CSI report is the periodic CSI report or the aperiodic CSI report, the UE may occupy the first CSI processing unit; however, in a BWP switching scenario, for the periodic CSI report or the aperiodic CSI report, the UE needs to continue to use the first CSI processing unit in the measurement process. Therefore, it can be ensured that the measurement process is normally completed, while the first CSI processing unit is not wasted.

Optionally, in still another possible implementation of this embodiment of this disclosure, the UE may determine the target information based on the first signaling, the first information, and the second information.

Optionally, in this embodiment of this disclosure, in a case that the target information includes the first signaling, the CSI report, and the uplink channel, that the target information satisfies the preset condition is: the first signaling is the type-2 signaling, and the CSI report is the type-2 CSI report, and the uplink channel is the target uplink channel; and the UE may process the first CSI processing unit by using the first processing manner corresponding to the first signaling, the CSI report, and the uplink channel.

Figure 6:
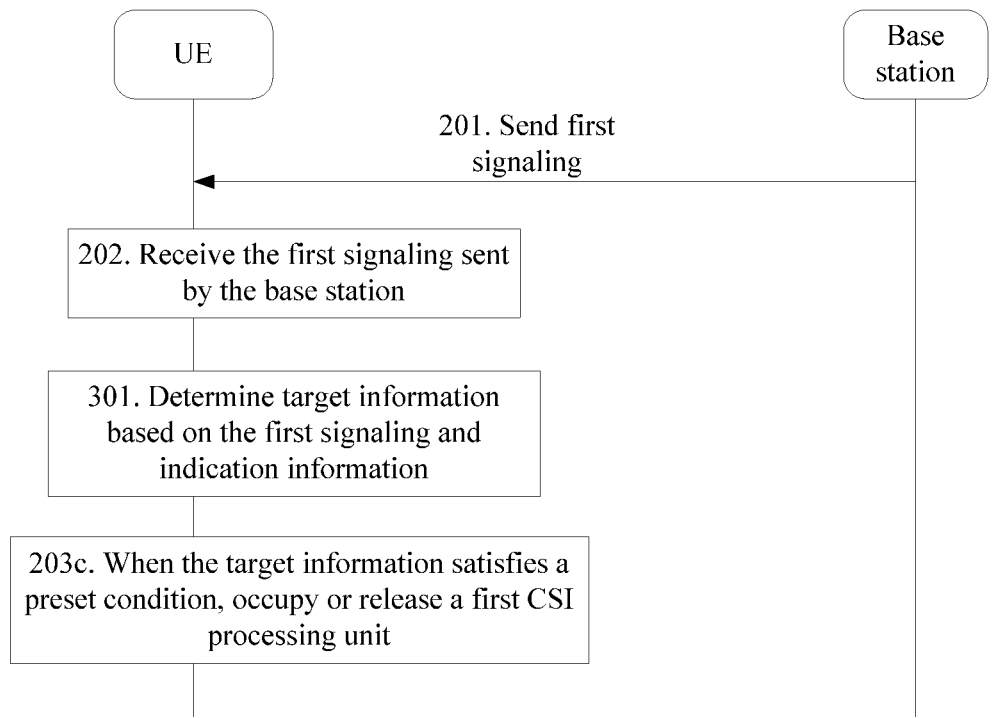
FIG. 6 is a fifth schematic diagram of a method for processing a CSI processing unit according to an embodiment of this disclosure.

Optionally, in this embodiment of this disclosure, in a case that the type-2 signaling is the BWP switching signaling, and the type-2 CSI report is a semi-persistent CSI report, and the target uplink channel is an uplink control channel, the first processing manner is occupying or releasing a CSI processing unit. With reference to FIG. 3, as shown in FIG. 6, the foregoing step 203 may be specifically implemented by the following step 203c:

Step 203c: When the target information satisfies the preset condition, the UE occupies or releases the first CSI processing unit.

In this embodiment of this disclosure, the first CSI processing unit in the foregoing step 203c is a CSI processing unit for measuring a downlink reference signal resource in the source BWP.

In this embodiment of this disclosure, when the target information includes the first signaling, the CSI report, and the uplink channel, and the first signaling is the type-2 signaling, and the CSI report is the type-2 CSI report, and the uplink channel is the target uplink channel, and the type-2 signaling is the BWP switching signaling, and the type-2 CSI report is the semi-persistent CSI report, and the target uplink channel is the uplink control channel, the UE may occupy or release the first CSI processing unit.

Optionally, in this embodiment of this disclosure, when the target information includes the first signaling, the CSI report, and the uplink channel, and the first signaling is the type-2 signaling, and the CSI report is the type-2 CSI report, and the uplink channel is the target uplink channel, and the type-2 signaling is the BWP switching signaling, and the type-2 CSI report is the semi-persistent CSI report, and the target uplink channel is the uplink control channel, the UE may occupy the first CSI processing unit.

Optionally, in this embodiment of this disclosure, the uplink control channel may include a PUCCH.

In this embodiment of this disclosure, when the target information includes the first signaling, the CSI report, and the uplink channel, and the first signaling is the type-2 signaling, and the CSI report is the type-2 CSI report, and the uplink channel is the target uplink channel, and the type-2 signaling is the BWP switching signaling, and the type-2 CSI report is the semi-persistent CSI report, and the target uplink channel is the uplink control channel, the UE may occupy the first CSI processing unit; however, in a BWP switching scenario, for the uplink control channel, the UE needs to continue to use the first CSI processing unit in the measurement process. Therefore, it can be ensured that the measurement process is normally completed, while the first CSI processing unit is not wasted.

Figure 7:
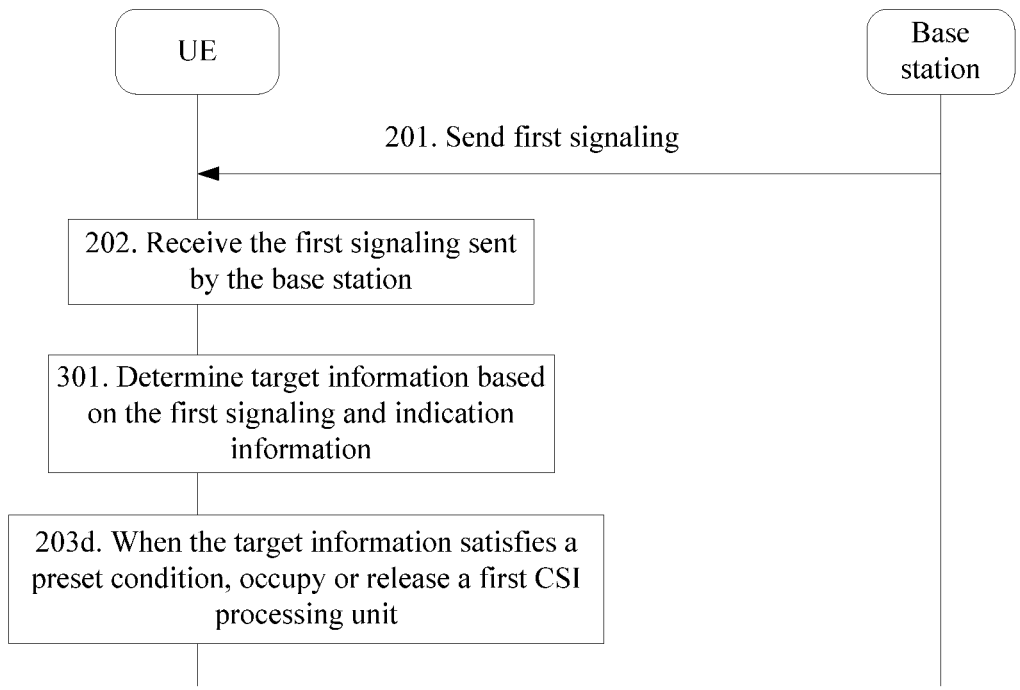
FIG. 7 is a sixth schematic diagram of a method for processing a CSI processing unit according to an embodiment of this disclosure.

Optionally, in this embodiment of this disclosure, in a case that the type-2 signaling is the BWP switching signaling, and the type-2 CSI report is the semi-persistent CSI report, and the target uplink channel is an uplink data channel, the first processing manner is occupying or releasing a CSI processing unit. With reference to FIG. 3, as shown in FIG. 7, the foregoing step 203 may be specifically implemented by the following step 203d:

Step 203d: When the target information satisfies the preset condition, the UE occupies or releases the first CSI processing unit.

In this embodiment of this disclosure, the first CSI processing unit in the foregoing step 203d is a CSI processing unit for measuring a downlink reference signal resource in the source BWP.

In this embodiment of this disclosure, when the target information includes the first signaling, the CSI report, and the uplink channel, and the first signaling is the type-2 signaling, and the CSI report is the type-2 CSI report, and the uplink channel is the target uplink channel, and the type-2 signaling is the BWP switching signaling, and the type-2 CSI report is the semi-persistent CSI report, and the target uplink channel is the uplink data channel, the UE may occupy or release the first CSI processing unit.

Optionally, in this embodiment of this disclosure, when the target information includes the first signaling, the CSI report, and the uplink channel, and the first signaling is the type-2 signaling, and the CSI report is the type-2 CSI report, and the uplink channel is the target uplink channel, and the type-2 signaling is the BWP switching signaling, and the type-2 CSI report is the semi-persistent CSI report, and the target uplink channel is the uplink data channel, the UE may release the first CSI processing unit.

Optionally, in this embodiment of this disclosure, the uplink data channel may include a PUSCH.

In this embodiment of this disclosure, when the target information includes the first signaling, the CSI report, and the uplink channel, and the first signaling is the type-2 signaling, and the CSI report is the type-2 CSI report, and the uplink channel is the target uplink channel, and the type-2 signaling is the BWP switching signaling, and the type-2 CSI report is the semi-persistent CSI report, and the target uplink channel is the uplink data channel, the UE may release the first CSI processing unit. Therefore, waste of the first CSI processing unit in the measurement process of the UE can be reduced, and utilization of the first CSI processing unit in the measurement process of the UE can be increased.

In this embodiment of this disclosure, when the target information includes the first signaling, the CSI report, and the uplink channel, and the first signaling is the type-2 signaling, and the CSI report is the type-2 CSI report, and the uplink channel is the target uplink channel, and the type-2 signaling is the BWP switching signaling, and the type-2 CSI report is the semi-persistent CSI report, and the target uplink channel is the uplink data channel, the UE may release or occupy the first CSI processing unit; however, in a BWP switching scenario, for the uplink data channel, the UE needs to continue to use the first CSI processing unit in the measurement process. Therefore, it can be ensured that the measurement process is normally completed, while the first CSI processing unit is not wasted.

It may be understood that in this embodiment of this disclosure, after the UE releases the first CSI processing unit, when the UE performs a measurement process again, the UE may reallocate a CSI processing unit.

Figure 8:
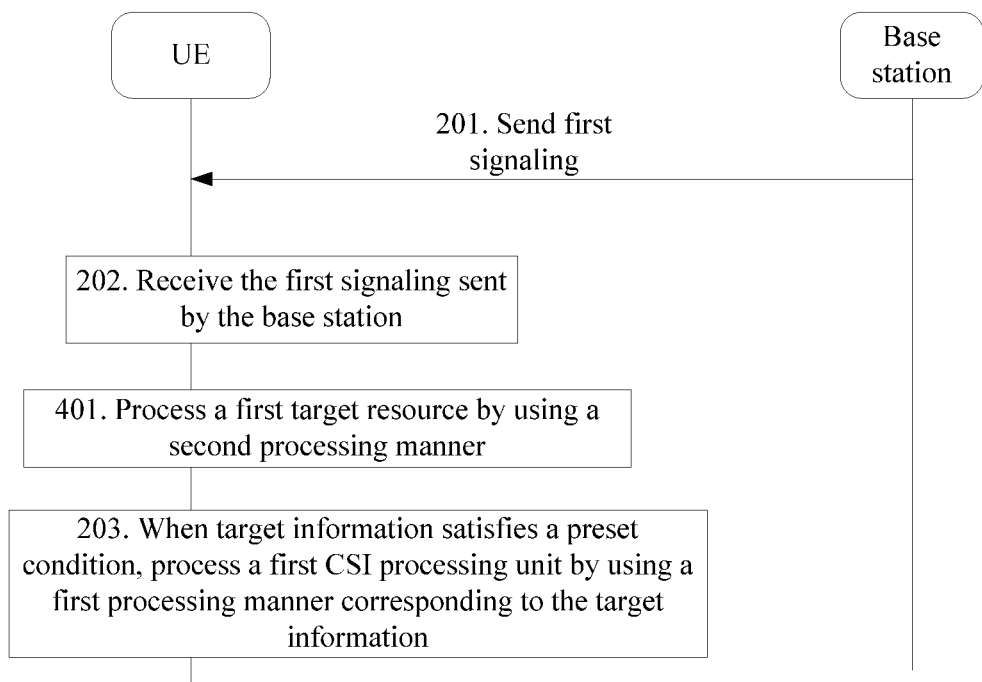
FIG. 8 is a seventh schematic diagram of a method for processing a CSI processing unit according to an embodiment of this disclosure.

Optionally, in this embodiment of this disclosure, with reference to FIG. 2, as shown in FIG. 8, after the foregoing step 202, the method for processing a CSI processing unit according to this embodiment of this disclosure may further include the following step 401.

Step 401: The UE processes a first target resource by using a second processing manner.

In this embodiment of this disclosure, a media access control (MAC) entity in the UE may process the first target resource by using the second processing manner, and the first target resource is a resource in the first cell or the source BWP.

Optionally, in this embodiment of this disclosure, the second processing manner may be releasing a resource; or the second processing manner may be releasing configuration information of a resource (for example, deleting RRC configuration information); or the second processing manner may be suspending a resource.

Optionally, in this embodiment of this disclosure, the UE may release the first target resource by using the second processing manner; or the UE may release configuration information of the first target resource by using the second processing manner; or the UE may suspend the first target resource by using the second processing manner.

Optionally, in this embodiment of this disclosure, the first target resource may include at least one of a target downlink reference signal resource, a target uplink reference signal resource, and the uplink channel for sending the CSI report to the base station by the UE, and the target downlink reference signal resource includes the first downlink reference signal resource.

Optionally, in this embodiment of this disclosure, a resource in the first cell may include at least one of a target downlink reference signal resource in the first cell, a target uplink reference signal resource in the first cell, and an uplink channel for sending the CSI report to the base station by the UE in the first cell, and the target downlink reference signal resource in the first cell may include a downlink reference signal resource in the first cell.

Optionally, in this embodiment of this disclosure, a resource in the source BWP may include at least one of a target downlink reference signal resource in the source BWP, a target uplink reference signal resource in the source BWP, and an uplink channel for sending the CSI report to the base station by the UE in the source BWP, and the target downlink reference signal resource in the source BWP may include a downlink reference signal resource in the source BWP.

Optionally, in this embodiment of this disclosure, the target downlink reference signal resource may include a downlink reference signal resource in the first cell or a downlink reference signal resource in the source BWP.

It should be noted that for descriptions about the downlink reference signal resource in the first cell or the downlink reference signal resource in the source BWP, reference may be made to the descriptions in the foregoing embodiments. Details are not described again herein.

Optionally, in this embodiment of this disclosure, the target uplink reference signal resource may include an uplink reference signal resource in the first cell or an uplink reference signal resource in the source BWP.

Optionally, in this embodiment of this disclosure, the uplink reference signal resource in the first cell may include a sounding reference signal (SRS) resource; and the uplink reference signal resource in the source BWP may include an SRS resource in the source BWP.

For example, the SRS resource may be a semi-persistent SRS resource.

Optionally, in this embodiment of this disclosure, the uplink channel for sending the CSI report to the base station by the UE may include the uplink channel for sending the CSI report to the base station by the UE in the first cell or the uplink channel for sending the CSI report to the base station by the UE in the source BWP.

Optionally, in this embodiment of this disclosure, the uplink channel for sending the CSI report to the base station by the UE in the first cell may be an uplink control channel (for example, a PUCCH) or an uplink data channel (for example, a PUSCH) in the first cell. The uplink channel for sending the CSI report to the base station by the UE in the source BWP may be an uplink control channel (for example, a PUCCH) or an uplink data channel (for example, a PUSCH) in the source BWP.

For example, an uplink channel for sending the semi-persistent CSI report to the base station by the UE may be a PUCCH.

It should be noted that in this embodiment of this disclosure, an execution sequence of step 401 and step 203 is not limited. Specifically, in an implementation, step 203 may be performed first, and then step 401 is performed. To be specific, the UE may first process the first CSI processing unit by using the first processing manner, and then process the first target resource by using the second processing manner. In another implementation, step 401 may be performed first, and then step 203 is performed. To be specific, the UE may first process the first target resource by using the second processing manner, and then process the first CSI processing unit by using the first processing manner. In still another implementation, step 203 and step 401 may be performed simultaneously. To be specific, the UE may simultaneously process the first CSI processing unit by using the first processing manner and process the first target resource by using the second processing manner.

In this embodiment of this disclosure, in the measurement process, after the UE receives first signaling, the UE may process the first target resource by using the second processing manner, and process the first CSI processing unit by using the first processing manner corresponding to the target information. Therefore, waste of resources (the first CSI processing unit and the first target resource) in the measurement process of the UE can be reduced, and utilization of the resources in the measurement process of the UE can be increased.

Figure 9:
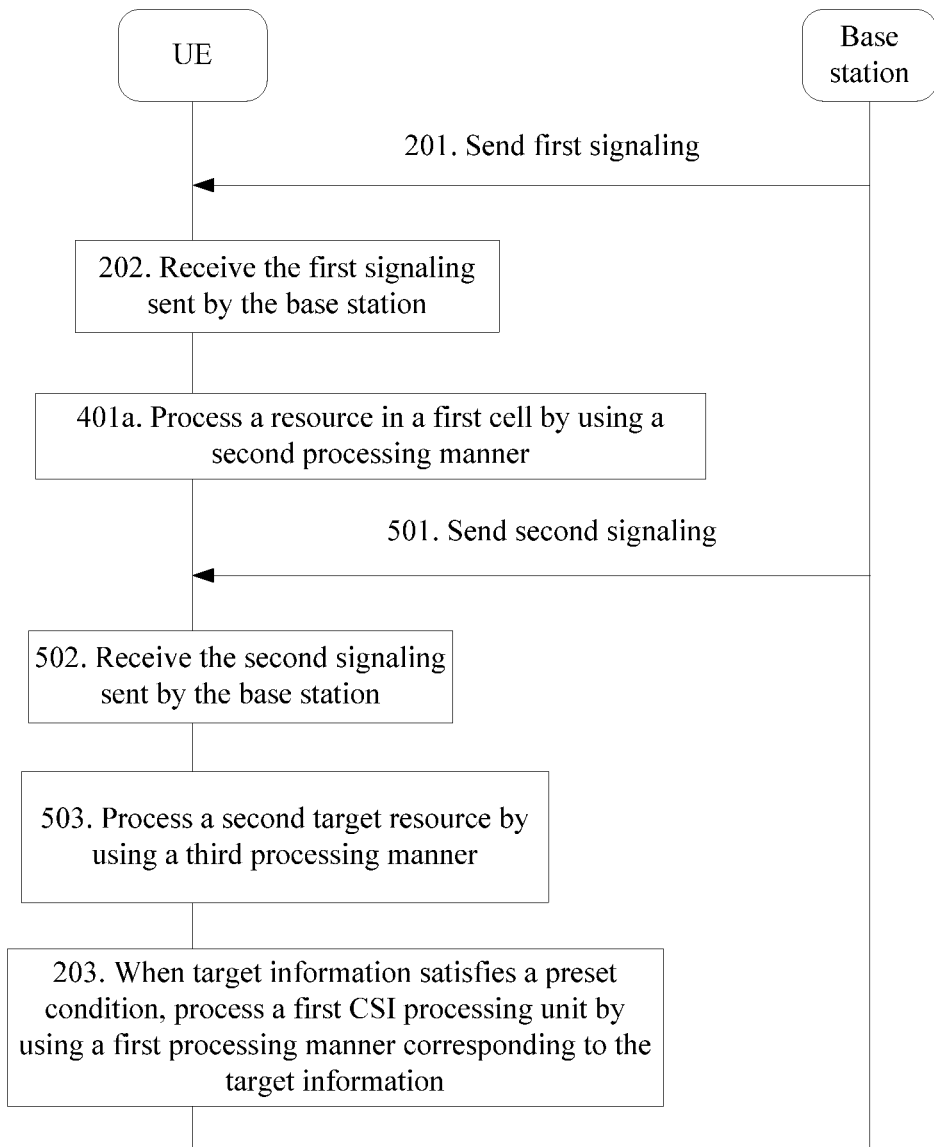
FIG. 9 is an eighth schematic diagram of a method for processing a CSI processing unit according to an embodiment of this disclosure.

Optionally, in this embodiment of this disclosure, the first signaling is used to deactivate the first cell, and the first target resource is a resource in the first cell. With reference to FIG. 8, as shown in FIG. 9, the foregoing step 401 may be specifically implemented by the following step 401a, and after the foregoing step 401, the method for processing a CSI processing unit according to this embodiment of this disclosure may further include the following step 501 to step 503.

Step 401a: The UE processes a resource in the first cell by using the second processing manner.

In this embodiment of this disclosure, the MAC entity in the UE may process the resource in the first cell by using the second processing manner.

It should be noted that for descriptions about the second processing manner and the resource in the first cell, reference may be made to the descriptions in the foregoing embodiments. Details are not described again herein.

Step 501: The base station sends second signaling to the UE.

In this embodiment of this disclosure, the second signaling in the foregoing step 501 may be used to instruct to activate a second cell that provides a service for the UE, and the second cell is the same as or different from the first cell.

In this embodiment of this disclosure, the second cell may be a cell that serves the UE.

It may be understood that in this embodiment of this disclosure, when the UE camps on the first cell, the first cell is the cell that serves the UE; and when the UE camps on the second cell, the second cell is the cell that serves the UE.

In this embodiment of this disclosure, the base station may send the second signaling (for example, cell activation signaling) to the UE, so that the base station and the UE activate the second cell.

Step 502: The UE receives the second signaling sent by the base station.

Step 503: The UE processes a second target resource by using a third processing manner.

In this embodiment of this disclosure, the MAC entity in the UE may process the second target resource by using the third processing manner, and the second target resource is a resource in the second cell.

Optionally, in this embodiment of this disclosure, the second processing manner may be releasing a resource, releasing configuration information of a resource, or suspending a resource. The third processing manner is activating a resource based on an activation command sent by the base station, or activating or restoring a resource based on configuration information sent by the base station.

Optionally, in this embodiment of this disclosure, after the UE processes the first target resource by using the second processing manner, and the UE receives the second signaling, the UE may process the second target resource by using the third processing manner.

In this embodiment of this disclosure, in a case that the second target resource is in a released state before the UE receives the second signaling, the third processing manner used by the UE after the UE receives the second signaling is activating the second target resource; in a case that the second target resource is in a state of "configuration information released or deleted" before the UE receives the second signaling, the third processing manner used by the UE after the UE receives the second signaling is activating the second target resource based on configuration information sent by the base station; or in a case that the second target resource is in a suspended state before the UE receives the second signaling, the third processing manner used by the UE after the UE receives the second signaling is restoring the second target resource. Specifically, the third processing manner used by the UE after the UE receives the second signaling may be determined based on a specific status of the second target resource before the UE receives the second signaling. This is not limited in this embodiment of this disclosure.

Optionally, in this embodiment of this disclosure, the second target resource may include at least one of a target downlink reference signal resource, a target uplink reference signal resource, and an uplink channel for sending the CSI report to the base station by the UE, and the target downlink reference signal resource includes the first downlink reference signal resource.

In this embodiment of this disclosure, because the UE may process the first CSI processing unit by using the first processing manner, and may process the resource in the first cell by using the second processing manner, waste of the resources (the first CSI processing unit and the first target resource) in the measurement process of the UE can be reduced, and utilization of the resources in the measurement process of the UE can be increased; in addition, because the UE may process the second target resource (for example, the resource in the second cell) by using the third processing manner after the UE receives the second signaling (used to instruct to activate the second cell) sent by the base station, it can be ensured that the resource in the second cell can be normally used and it can be ensured that the measurement process of the UE can be normally performed.

Figure 10:
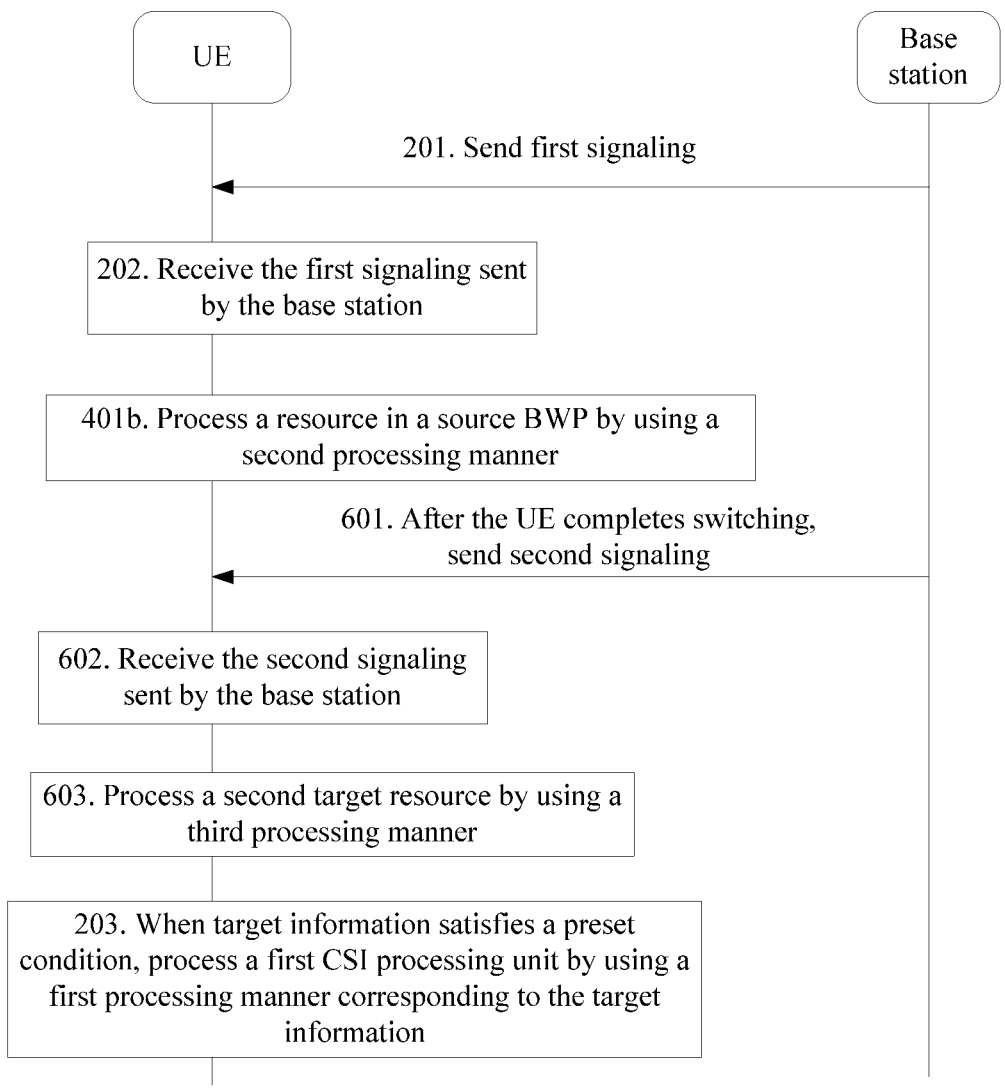
FIG. 10 is a ninth schematic diagram of a method for processing a CSI processing unit according to an embodiment of this disclosure.

Optionally, in this embodiment of this disclosure, the first signaling may be used to instruct the UE to switch from the source BWP to the target BWP, and the first target resource is a resource in the source BWP. With reference to FIG. 8, as shown in FIG. 10, the foregoing step 401 may be specifically implemented by the following step 401b, and after the foregoing step 401, the method for processing a CSI processing unit according to this embodiment of this disclosure may further include the following step 601 to step 603.

Step 401b: The UE processes a resource in the source BWP by using the second processing manner.

In this embodiment of this disclosure, the MAC entity in the UE may process the resource in the source BWP by using the second processing manner.

It should be noted that for descriptions about the second processing manner and the resource in the source BWP, reference may be made to the descriptions in the foregoing embodiments. Details are not described again herein.

Step 601: After the UE completes switching, the base station sends second signaling to the UE.

In this embodiment of this disclosure, the second signaling in the foregoing step 601 may be used to instruct to activate a resource in the target BWP.

In this embodiment of this disclosure, completing switching by the UE may be understood as having switched from the source BWP to the target BWP by the UE and learning, by the base station, that the UE has switched from the source BWP to the target BWP.

Optionally, in this embodiment of this disclosure, the resource in the target BWP may include at least one of a target downlink reference signal resource in the target BWP, a target uplink reference signal resource in the target BWP, and an uplink channel for sending the CSI report to the base station by the UE in the target BWP.

Step 602: The UE receives the second signaling sent by the base station.

Step 603: The UE processes a second target resource by using a third processing manner.

In this embodiment of this disclosure, the MAC entity in the UE may process the second target resource by using the third processing manner, and the second target resource is a resource in the target BWP.

It should be noted that for descriptions about the third processing manner and the resource in the target BWP, reference may be made to the descriptions in the foregoing embodiments. Details are not described again herein.

In this embodiment of this disclosure, because the UE may process the first CSI processing unit by using the first processing manner, and may process the resource in the first cell by using the second processing manner, waste of the resources (the first CSI processing unit and the first target resource) in the measurement process of the UE can be reduced, and utilization of the resources in the measurement process of the UE can be increased; in addition, because the UE may process the second target resource (for example, the resource in the target BWP) by using the third processing manner after the UE completes switching and receives the second signaling (used to instruct to activate the resource in the target BWP) sent by the base station, it can be ensured that the resource in the target BWP can be normally used and it can be ensured that the measurement process of the UE can be normally performed.

Figure 11:
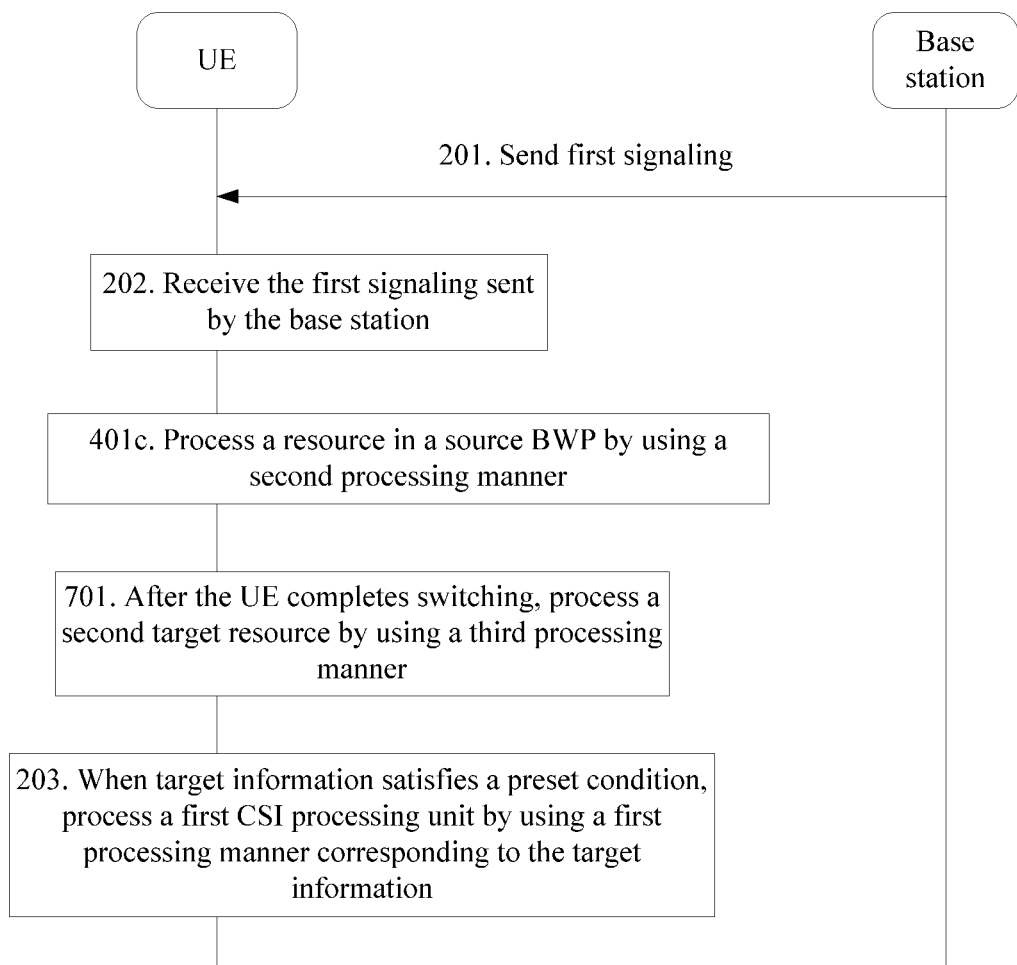
FIG. 11 is a tenth schematic diagram of a method for processing a CSI processing unit according to an embodiment of this disclosure.

Optionally, in this embodiment of this disclosure, the first signaling may be used to instruct the UE to switch from the source BWP to the target BWP, and the first target resource is a resource in the source BWP. With reference to FIG. 8, as shown in FIG. 11, the foregoing step 401 may be specifically implemented by the following step 401c, and after the foregoing step 401, the method for processing a CSI processing unit according to this embodiment of this disclosure may further include the following step 701.

Step 401c: The UE processes a resource in the source BWP by using the second processing manner.

In this embodiment of this disclosure, the MAC entity in the UE may process the resource in the source BWP by using the second processing manner.

It should be noted that for descriptions about the second processing manner and the resource in the source BWP, reference may be made to the descriptions in the foregoing embodiments. Details are not described again herein.

Step 701: After the UE completes switching, the UE processes a second target resource by using a third processing manner.

In this embodiment of this disclosure, the MAC entity in the UE may process the second target resource by using the third processing manner, and the second target resource is a resource in the target BWP.

In this embodiment of this disclosure, because the UE may process the first CSI processing unit by using the first processing manner, and may process the resource in the first cell by using the second processing manner, waste of the resources (the first CSI processing unit and the first target resource) in the measurement process of the UE can be reduced, and utilization of the resources in the measurement process of the UE can be increased; in addition, because the UE may process the second target resource (for example, the resource in the target BWP) by using the third processing manner after the UE completes switching, it can be ensured that the resource in the target BWP can be normally used and it can be ensured that the measurement process of the UE can be normally performed.

Embodiment 2

Figure 12:
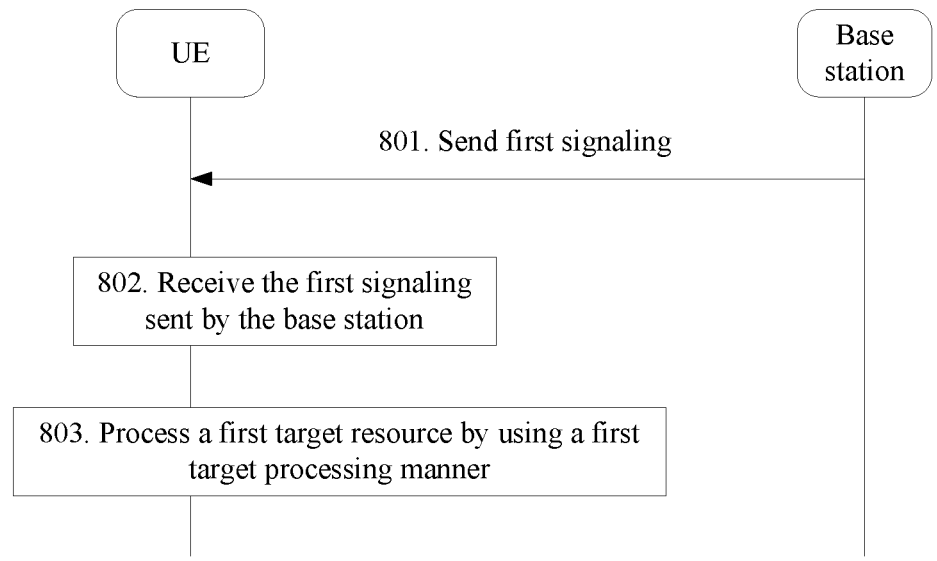
FIG. 12 is a schematic diagram of a resource processing method according to an embodiment of this disclosure.

Based on the communications system shown in FIG. 1, this embodiment of this disclosure provides a resource processing method. As shown in FIG. 12, the resource processing method may include the following step 801 to step 803.

Step 801: A base station sends first signaling to UE.

In this embodiment of this disclosure, the first signaling may be used to instruct to deactivate a first cell that provides a service for the UE, or used to instruct the UE to switch from a source BWP to a target BWP.

Step 802: The UE receives the first signaling sent by the base station.

Step 803: The UE processes a first target resource by using a first target processing manner.

In this embodiment of this disclosure, a MAC entity in the UE may process the first target resource by using the first target processing manner, and the first target resource is a resource in the first cell or the source BWP.

In the resource processing method provided in this embodiment of this disclosure, after the UE receives the first signaling sent by the base station, the UE may process the first target resource by using the first target processing manner. When performing a measurement process, the UE may process the first target resource by using different first target processing manners. Therefore, the UE can control usage of resources based on an actual requirement. Therefore, waste of resources in the measurement process of the UE can be reduced, and utilization of the resources in the measurement process of the UE can be increased.

Optionally, in this embodiment of this disclosure, the first signaling may be used to deactivate the first cell, and the first target resource is a resource in the first cell. The foregoing step 801 may be specifically implemented by the following step 801a, and after the foregoing step 801, the resource processing method provided in this embodiment of this disclosure may further include the following step 901 to step 903.

Step 801a: The UE processes a resource in the first cell by using the first target processing manner.

In this embodiment of this disclosure, the MAC entity in the UE may process the resource in the first cell by using the first target processing manner.

Step 901: The base station sends second signaling to the UE.

In this embodiment of this disclosure, the second signaling may be used to instruct to activate a second cell that provides a service for the UE, and the second cell is the same as or different from the first cell.

Step 902: The UE receives the second signaling sent by the base station.

Step 903: The UE processes a second target resource by using a second target processing manner.

In this embodiment of this disclosure, the MAC entity in the UE may process the second target resource by using the second target processing manner, and the second target resource is a resource in the second cell.

In this embodiment of this disclosure, in the measurement process, after the UE receives the second signaling (used to instruct to activate the second cell), the UE may process the second target resource (for example, the resource in the second cell) by using the second target processing manner. Therefore, it can be ensured that the resource in the second cell can be normally used and it can be ensured that the measurement process of the UE can be normally performed.

Optionally, in this embodiment of this disclosure, the first signaling may be used to instruct the UE to switch from the source BWP to the target BWP, and the first target resource is a resource in the source BWP. The foregoing step 801 may be specifically implemented by the following step 801b, and after the foregoing step 801, the resource processing method provided in this embodiment of this disclosure may further include the following step 1001 to step 1003.

Step 801b: The UE processes a resource in the source BWP by using the first target processing manner.

In this embodiment of this disclosure, the MAC entity in the UE may process the resource in the source BWP by using the first target processing manner.

Step 1001: After the UE completes switching, the base station sends second signaling to the UE.

In this embodiment of this disclosure, the second signaling may be used to instruct to activate a resource in the target BWP.

Step 1002: The UE receives the second signaling sent by the base station.

Step 1003: The UE processes a second target resource by using a second target processing manner.

In this embodiment of this disclosure, the MAC entity in the UE may process the second target resource by using the second target processing manner, and the second target resource is a resource in the target BWP.

In this embodiment of this disclosure, in the measurement process, after the UE receives the second signaling (used to instruct to activate the resource in the target BWP), the UE may process the second target resource (for example, the resource in the target BWP) by using the second target processing manner. Therefore, it can be ensured that the resource in the target BWP can be normally used and it can be ensured that the measurement process of the UE can be normally performed.

Optionally, in this embodiment of this disclosure, the first signaling is used to instruct the UE to switch from the source BWP to the target BWP, and the first target resource is a resource in the source BWP. The foregoing step 801 may be specifically implemented by the following step 801c, and after the foregoing step 801, the resource processing method provided in this embodiment of this disclosure may further include the following step 1101.

Step 801c: The UE processes a resource in the source BWP by using the first target processing manner.

In this embodiment of this disclosure, the MAC entity in the UE may process the resource in the source BWP by using the first target processing manner.

Step 1101: After the UE completes switching, the UE processes a second target resource by using a second target processing manner.

In this embodiment of this disclosure, after the UE completes switching, the MAC entity in the UE may process the second target resource by using the second target processing manner, and the second target resource is a resource in the target BWP.

In this embodiment of this disclosure, in the measurement process, the UE may process the second target resource (for example, the resource in the target BWP) by using the second target processing manner. Therefore, it can be ensured that the resource in the target BWP can be normally used and it can be ensured that the measurement process of the UE can be normally performed.

Optionally, in this embodiment of this disclosure, the first target processing manner may be releasing a resource, releasing configuration information of a resource, or suspending a resource. The second target processing manner is activating a resource based on an activation command sent by the base station, or activating or restoring a resource based on configuration information sent by the base station.

In this embodiment of this disclosure, in a case that the resource in the target BWP is in a released state before the UE completes switching, the third processing manner used by the UE after the UE completes switching is activating the resource in the target BWP; in a case that the resource in the target BWP is in a state of "configuration information released or deleted" before the UE completes switching, the third processing manner used by the UE after the UE completes switching is activating the resource in the target BWP based on configuration information sent by the base station; or in a case that the resource in the target BWP is in a suspended state before the UE completes switching, the third processing manner used by the UE after the UE completes switching is restoring the resource in the target BWP. Specifically, the third processing manner used by the UE after the UE completes switching may be determined based on a specific status of the resource in the target BWP before the UE completes switching. This is not limited in this embodiment of this disclosure.

For other descriptions about the first target processing manner and the second target processing manner, reference may be made to the descriptions about the second processing manner and the third processing manner in the foregoing embodiment. Details are not described herein.

Optionally, in this embodiment of this disclosure, the first target resource or the second target resource may include at least one of a target downlink reference signal resource, a target uplink reference signal resource, and an uplink channel for sending a CSI report to the base station by the UE.

It should be noted that for detailed descriptions about the steps in Embodiment 2, reference may be made to the related descriptions in the foregoing embodiment correspondingly. Details are not described again herein.

Figure 13:
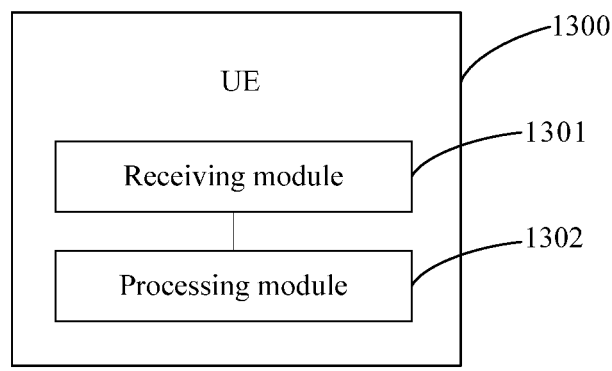
FIG. 13 is a first schematic structural diagram of UE according to an embodiment of this disclosure.

As shown in FIG. 13, an embodiment of this disclosure provides UE 1300, where the UE 1300 may include a receiving module 1301 and a processing module 1302.

The receiving module 1301 is configured to receive first signaling from a base station, where the first signaling is used to instruct to deactivate a first cell that provides a service for the UE, or used to instruct the UE to switch from a source BWP to a target BWP. After the receiving module 1301 receives the first signaling, when target information satisfies a preset condition, the processing module 1302 is configured to process a first CSI processing unit by using a first processing manner corresponding to the target information, where the target information includes at least the first signaling, the first CSI processing unit is a CSI processing unit for measuring a first downlink reference signal resource, and the first downlink reference signal resource is a downlink reference signal resource in the first cell or the source BWP.

Figure 14:
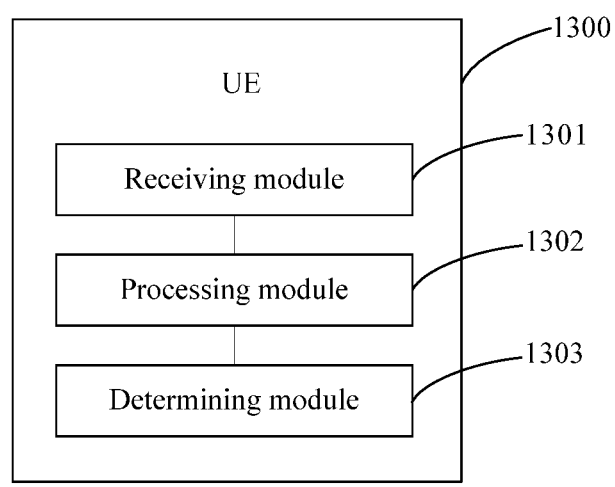
FIG. 14 is a second schematic structural diagram of UE according to an embodiment of this disclosure.

Optionally, in this embodiment of this disclosure, with reference to FIG. 13, as shown in FIG. 14, the UE 1300 provided in this embodiment of this disclosure may further include a determining module 1303. The determining module 1303 is configured to determine the target information based on the first signaling and indication information after the receiving module 1301 receives the first signaling sent by the base station, where the indication information is first information indicated by the base station to the UE, or the indication information is first information and second information indicated by the base station to the UE, the first information is used to indicate a type of a CSI report sent by the UE to the base station, the second information is used to indicate an uplink channel for sending the CSI report to the base station by the UE, and the CSI report includes a result of measuring the first downlink reference signal resource by the first CSI processing unit.

Optionally, in this embodiment of this disclosure, in a case that the target information includes the first signaling, that the target information satisfies the preset condition is: the first signaling is type-1 signaling; in a case that the target information includes the first signaling and the CSI report, that the target information satisfies the preset condition is: the first signaling is type-2 signaling, and the CSI report is a type-1 CSI report; or in a case that the target information includes the first signaling, the CSI report, and the uplink channel, that the target information satisfies the preset condition is: the first signaling is type-2 signaling, the CSI report is a type-2 CSI report, and the uplink channel is a target uplink channel.

Optionally, in this embodiment of this disclosure, in a case that the type-1 signaling is cell deactivation signaling, the first processing manner is releasing a CSI processing unit. The processing module 1302 may be specifically configured to release the first CSI processing unit, where the first CSI processing unit is a CSI processing unit for measuring a downlink reference signal resource in the first cell.

Optionally, in this embodiment of this disclosure, in a case that the type-2 signaling is BWP switching signaling, and the type-1 CSI report is a periodic CSI report or an aperiodic CSI report, the first processing manner is occupying a CSI processing unit. The processing module 1302 may be specifically configured to occupy the first CSI processing unit, where the first CSI processing unit is a CSI processing unit for measuring a downlink reference signal resource in the source BWP.

Optionally, in this embodiment of this disclosure, in a case that the type-2 signaling is BWP switching signaling, and the type-2 CSI report is a semi-persistent CSI report, and the target uplink channel is an uplink control channel, the first processing manner is occupying or releasing a CSI processing unit. The processing module 1302 may be specifically configured to occupy or release the first CSI processing unit, where the first CSI processing unit is a CSI processing unit for measuring a downlink reference signal resource in the source BWP.

Optionally, in this embodiment of this disclosure, in a case that the type-2 signaling is BWP switching signaling, and the type-2 CSI report is a semi-persistent CSI report, and the target uplink channel is an uplink data channel, the first processing manner is occupying or releasing a CSI processing unit. The processing module 1302 may be specifically configured to occupy or release the first CSI processing unit, where the first CSI processing unit is a CSI processing unit for measuring a downlink reference signal resource in the source BWP.

Optionally, in this embodiment of this disclosure, the UE 1300 provided in this embodiment of this disclosure may further include a MAC entity, where the MAC entity may be the processing module 1302. After the receiving module 1301 receives the first signaling sent by the base station, the MAC entity may be configured to process a first target resource by using a second processing manner, where the first target resource is a resource in the first cell or the source BWP.

Optionally, in this embodiment of this disclosure, the first signaling is used to deactivate the first cell, and the first target resource is a resource in the first cell. The MAC entity may be specifically configured to process the resource in the first cell by using the second processing manner. The receiving module 1301 may be further configured to receive second signaling sent by the base station, where the second signaling is used to instruct to activate a second cell that provides a service for the UE, where the second cell is the same as or different from the first cell. The MAC entity may be further configured to process a second target resource by using a third processing manner, where the second target resource is a resource in the second cell.

Optionally, in this embodiment of this disclosure, the first signaling is used to instruct the UE to switch from the source BWP to the target BWP, and the first target resource is a resource in the source BWP. The MAC entity may be specifically configured to process the resource in the source BWP by using the second processing manner. After the UE completes switching, the receiving module 1301 may be further configured to receive second signaling sent by the base station, where the second signaling is used to instruct to activate a resource in the target BWP. The MAC entity may be further configured to process a second target resource by using a third processing manner, where the second target resource is the resource in the target BWP.

Optionally, in this embodiment of this disclosure, the first signaling is used to instruct the UE to switch from the source BWP to the target BWP, and the first target resource is a resource in the source BWP. The MAC entity may be specifically configured to process the resource in the source BWP by using the second processing manner. After the UE completes switching, the MAC entity may be further configured to process a second target resource by using a third processing manner, where the second target resource is a resource in the target BWP.

Optionally, in this embodiment of this disclosure, the second processing manner is releasing a resource, releasing configuration information of a resource, or suspending a resource; and the third processing manner is activating a resource based on an activation command sent by the base station, or activating or restoring a resource based on configuration information sent by the base station.

Optionally, in this embodiment of this disclosure, the first target resource or the second target resource may include at least one of a target downlink reference signal resource, a target uplink reference signal resource, and an uplink channel for sending the CSI report to the base station by the UE, and the target downlink reference signal resource includes the first downlink reference signal resource.

The UE provided in this embodiment of this disclosure can implement each process implemented by the UE in the foregoing method embodiment. To avoid repetition, details are not described again herein.

In the embodiment of this disclosure, after the UE receives the first signaling sent by the base station, when the target information (the target information includes at least the first signaling) satisfies the preset condition, the UE may process the first CSI processing unit by using the first processing manner corresponding to the target information. When performing a measurement process, the UE may determine different first processing manners based on different target information. Therefore, for different target information, the UE can process the first CSI processing unit by using different first processing manners, that is, the UE can control usage of the first CSI processing unit based on an actual requirement. Therefore, waste of CSI processing units in the measurement process of the UE can be reduced, and utilization of the CSI processing units in the measurement process of the UE can be increased.

Figure 15:
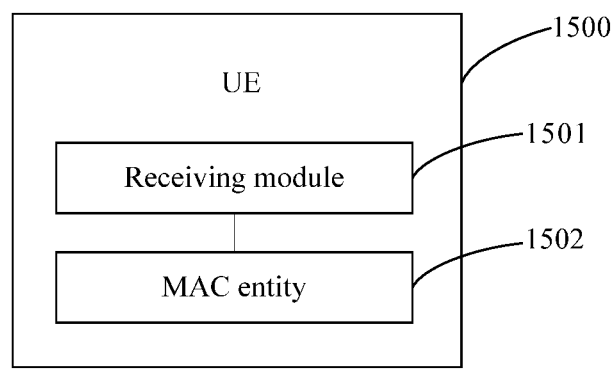
FIG. 15 is a third schematic structural diagram of UE according to an embodiment of this disclosure.

As shown in FIG. 15, an embodiment of this disclosure provides UE 1500, where the UE 1500 may include a receiving module 1501 and a MAC entity 1502.

The receiving module 1501 is configured to receive first signaling from a base station, where the first signaling is used to instruct to deactivate a first cell that provides a service for the UE, or used to instruct the UE to switch from a source BWP to a target BWP. After the receiving module 1501 receives the first signaling, the MAC entity 1502 is configured to process a first target resource by using a first target processing manner, where the first target resource is a resource in the first cell or the source BWP.

Optionally, in this embodiment of this disclosure, the first signaling is used to instruct to deactivate the first cell, and the first target resource is a resource in the first cell. The MAC entity 1502 may be specifically configured to process the resource in the first cell by using the first target processing manner. The receiving module 1501 may be further configured to receive second signaling sent by the base station, where the second signaling is used to instruct to activate a second cell that provides a service for the UE, where the second cell is the same as or different from the first cell. The MAC entity 1502 may be further configured to process a second target resource by using a second target processing manner, where the second target resource is a resource in the second cell.

Optionally, in this embodiment of this disclosure, the first signaling is used to instruct the UE to switch from the source BWP to the target BWP, and the first target resource is a resource in the source BWP. The MAC entity 1502 may be specifically configured to process the resource in the source BWP by using the first target processing manner. After the UE completes switching, the receiving module 1501 may be further configured to receive second signaling sent by the base station, where the second signaling is used to instruct to activate a resource in the target BWP. The MAC entity 1502 may be further configured to process a second target resource by using a second target processing manner, where the second target resource is the resource in the target BWP.

Optionally, in this embodiment of this disclosure, the first signaling is used to instruct the UE to switch from the source BWP to the target BWP, and the first target resource is a resource in the source BWP. The MAC entity 1502 may be specifically configured to process the resource in the source BWP by using the first target processing manner. After the UE completes switching, the MAC entity 1502 may be further configured to process a second target resource by using a second target processing manner, where the second target resource is a resource in the target BWP.

Optionally, in this embodiment of this disclosure, the first target processing manner is releasing a resource, releasing configuration information of a resource, or suspending a resource; and the second target processing manner is activating a resource based on an activation command sent by the base station, or activating or restoring a resource based on configuration information sent by the base station.

Optionally, in this embodiment of this disclosure, the first target resource or the second target resource may include at least one of a target downlink reference signal resource, a target uplink reference signal resource, and an uplink channel for sending a CSI report to the base station by the UE.

The UE provided in this embodiment of this disclosure can implement each process implemented by the UE in the foregoing method embodiment. To avoid repetition, details are not described again herein.

In the embodiment of this disclosure, after the UE receives the first signaling sent by the base station, the UE may process the first target resource by using the first target processing manner. When performing a measurement process, the UE may process the first target resource by using different first target processing manners. Therefore, the UE can control usage of resources based on an actual requirement. Therefore, waste of resources in the measurement process of the UE can be reduced, and utilization of the resources in the measurement process of the UE can be increased.

Figure 16:
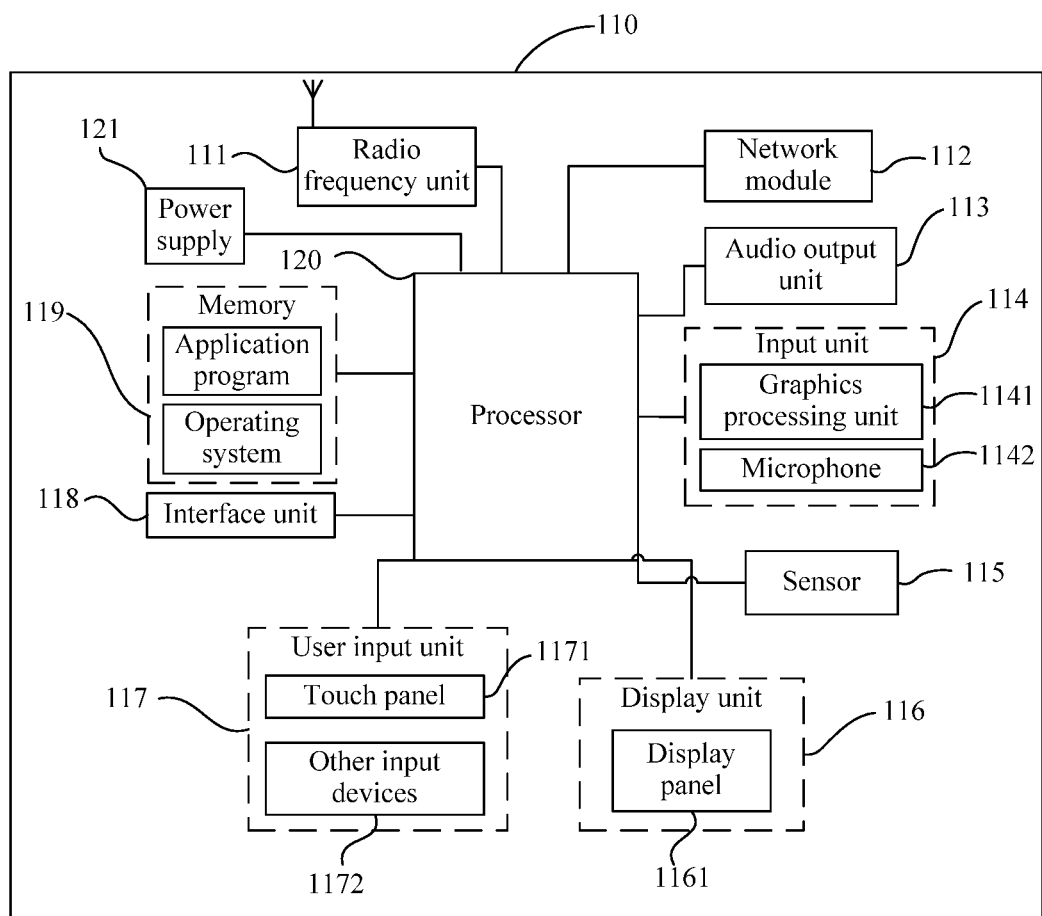
FIG. 16 is a schematic hardware diagram of UE according to an embodiment of this disclosure.

FIG. 16 is a schematic hardware diagram of UE according to an embodiment of this disclosure. As shown in FIG. 16, the UE 110 includes but is not limited to components such as a radio frequency unit 111, a network module 112, an audio output unit 113, an input unit 114, a sensor 115, a display unit 116, a user input unit 117, an interface unit 118, a memory 119, a processor 120, and a power supply 121.

It should be noted that, a person skilled in the art may understand that a structure of the UE shown in FIG. 16 does not constitute a limitation on the UE. A quantity of components included in the UE may be greater or less than that shown in FIG. 16, or some components are combined, or component arrangements are different. For example, in this embodiment of this disclosure, the UE includes but is not limited to a mobile phone, a tablet computer, a notebook computer, a palmtop computer, an in-vehicle terminal, a wearable device, a pedometer, or the like.

The processor 120 may be configured to: receive first signaling sent by a base station, where the first signaling is used to instruct to deactivate a first cell that provides a service for the UE, or used to instruct the UE to switch from a source BWP to a target BWP; and when target information satisfies a preset condition, process a first CSI processing unit by using a first processing manner corresponding to the target information, where the target information includes at least the first signaling, the first CSI processing unit is a CSI processing unit for measuring a first downlink reference signal resource, and the first downlink reference signal resource is a downlink reference signal resource in the first cell or the source BWP.

In the embodiment of this disclosure, after the UE receives the first signaling sent by the base station, when the target information (the target information includes at least the first signaling) satisfies the preset condition, the UE may process the first CSI processing unit by using the first processing manner corresponding to the target information. When performing a measurement process, the UE may determine different first processing manners based on different target information. Therefore, for different target information, the UE can process the first CSI processing unit by using different first processing manners, that is, the UE can control usage of the first CSI processing unit based on an actual requirement. Therefore, waste of CSI processing units in the measurement process of the UE can be reduced, and utilization of the CSI processing units in the measurement process of the UE can be increased.

The processor 120 may be further configured to: receive first signaling sent by a base station, where the first signaling is used to instruct to deactivate a first cell that provides a service for the UE, or used to instruct the UE to switch from a source BWP to a target BWP; and process a first target resource by using a first target processing manner, where the first target resource is a resource in the first cell or the source BWP.

In the embodiment of this disclosure, after the UE receives the first signaling sent by the base station, the UE may process the first target resource by using the first target processing manner. When performing a measurement process, the UE may process the first target resource by using different first target processing manners. Therefore, the UE can control usage of resources based on an actual requirement. Therefore, waste of resources in the measurement process of the UE can be reduced, and utilization of the resources in the measurement process of the UE can be increased.

It should be understood that in this embodiment of this disclosure, the radio frequency unit 111 may be configured to receive and send signals in an information reception or transmission or call process. Specifically, after receiving downlink data from the base station, the radio frequency unit 111 sends the downlink data to the processor 120 for processing, and in addition, sends uplink data to the base station. Generally, the radio frequency unit 111 includes but is not limited to an antenna, at least one amplifier, a transceiver, a coupler, a low noise amplifier, a duplexer, and the like. In addition, the radio frequency unit 111 may further communicate with a network and another device through a wireless communications system.

The UE provides wireless broadband Internet access for a user by using the network module 112, for example, helps the user send and receive e-mails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may further provide an audio output (for example, a call signal reception sound or a message reception sound) related to a specific function performed by the UE 110. The audio output unit 113 includes a speaker, a buzzer, a telephone receiver, and the like.

The input unit 114 is configured to receive an audio or video signal. The input unit 114 may include a graphics processing unit (GPU) 1141 and a microphone 1142. The graphics processing unit 1141 processes image data of a still picture or a video obtained by an image capture apparatus (for example, a camera) in an image capture mode or a video capture mode. A processed image frame may be displayed on the display unit 116. An image frame processed by the graphics processing unit 1141 may be stored in the memory 119 (or another storage medium) or sent by the radio frequency unit 111 or the network module 112. The microphone 1142 can receive a sound and can process the sound into audio data. The processed audio data can be converted in a telephone call mode into a format that can be sent to a mobile communications base station through the radio frequency unit 111, for outputting.

The UE 110 further includes at least one sensor 115, for example, a light sensor, a motion sensor, and another sensor. Specifically, the light sensor includes an ambient light sensor and a proximity sensor. The ambient light sensor may adjust luminance of a display panel 1161 based on brightness of ambient light. The proximity sensor may turn off and/or backlight the display panel 1161 when the UE 110 moves to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture of the UE (such as switching between landscape and portrait, related games, and magnetometer posture calibration), implement vibration recognition related functions (such as a pedometer and stroke), and the like. The sensor 115 may further include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information input by the user or information provided for the user. The display unit 116 may include the display panel 1161. The display panel 1161 may be configured in a form of a liquid crystal display (LCD), an organic light-emitting diode (OLED), or the like.

The user input unit 117 may be configured to receive input digit or character information, and generate a key signal input related to a user setting and function control of the UE. Specifically, the user input unit 117 includes a touch panel 1171 and other input devices 1172. The touch panel 1171, also referred to as a touchscreen, may capture a touch operation performed by the user on or near the touch panel (for example, an operation performed by the user on the touch panel 1171 or near the touch panel 1171 by using any appropriate object or accessory such as a finger or a stylus). The touch panel 1171 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 120, and receives and executes a command sent by the processor 120. In addition, the touch panel 1171 may be implemented in a plurality of forms, for example, a resistive, capacitive, infrared, or surface acoustic wave touch panel. The user input unit 117 may further include the other input devices 1172 in addition to the touch panel 1171. Specifically, the other input devices 1172 may include but are not limited to a physical keyboard, a function key (such as a volume control key or a power on/off key), a trackball, a mouse, a joystick, and the like. Details are not described herein.

Further, the touch panel 1171 may cover the display panel 1161. After the touch panel 1171 detects a touch operation on or near the touch panel, the touch panel 1171 transmits the touch operation to the processor 120 to determine a type of a touch event. Then the processor 120 provides a corresponding visual output on the display panel 1161 based on the type of the touch event. Although the touch panel 1171 and the display panel 1161 are used as two independent components to implement input and output functions of the UE in FIG. 16, the touch panel 1171 and the display panel 1161 may be integrated to implement the input and output functions of the UE in some embodiments. This is not specifically limited herein.

The interface unit 118 is an interface for connecting an external apparatus to the UE 110. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 118 may be configured to receive an input (for example, data information or power) from an external apparatus, and transmit the received input to one or more components in the UE 110, or may be configured to transmit data between the UE 110 and an external apparatus.

The memory 119 may be configured to store a software program and various data. The memory 119 may mainly include a program storage area and a data storage area. The program storage area may store an operating system, an application program required for at least one function (such as a sound play function and an image play function), and the like. The data storage area may store data created based on use of the UE (such as audio data and a phone book), and the like. In addition, the memory 119 may include a high-speed random access memory, or may include a non-volatile memory, for example, at least one magnetic disk storage device, a flash memory, or other volatile solid-state storage devices.

The processor 120 is a control center of the UE. The processor 120 uses various interfaces and lines to connect all parts of the entire UE, and performs various functions and data processing of the UE by running or executing the software program and/or module stored in the memory 119 and invoking data stored in the memory 119, thereby performing overall monitoring on the UE. The processor 120 may include one or more processing units. Optionally, the processor 120 may integrate an application processor and a modem processor. The application processor mainly processes the operating system, a user interface, an application program, and the like. The modem processor mainly processes wireless communication. It may be understood that the modem processor may alternatively not be integrated into the processor 120.

The UE 110 may further include the power supply 121 (such as a battery) supplying power to each component. Optionally, the power supply 121 may be logically connected to the processor 120 by using a power management system, so that functions such as charge and discharge management and power consumption management are implemented by using the power management system.

In addition, the UE 110 includes some functional modules that are not illustrated. Details are not described herein.

Optionally, an embodiment of this disclosure further provides UE, including the processor 120 and the memory 119 that are shown in FIG. 16, and a computer program stored in the memory 119 and capable of running on the processor 120. When the computer program is executed by the processor 120, each process of the foregoing method embodiment is implemented, and a same technical effect can be achieved. To avoid repetition, details are not described again herein.

An embodiment of this disclosure further provides a computer-readable storage medium, where the computer-readable storage medium stores a computer program. When the computer program is executed by the processor 120 shown in FIG. 16, each process of the foregoing method embodiment is implemented, and a same technical effect can be achieved. To avoid repetition, details are not described again herein. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A resource processing method, applied to user equipment (UE), and comprising:
receiving first signaling from a base station, wherein the first signaling is used to instruct to deactivate a first cell that provides a service for the UE, or used to instruct the UE to switch from a source bandwidth part (BWP) to a target BWP; and
processing, by a media access control (MAC) entity in the UE, a first target resource by using a first target processing manner, wherein the first target resource is a resource in the first cell or the source BWP;
wherein in case that the first signaling is used to instruct to deactivate the first cell, and the first target resource is the resource in the first cell;

the processing, by the MAC entity in the UE, the first target resource by using the first target processing manner comprises:

processing, by the MAC entity, the resource in the first cell by using the first target processing manner; and the method further comprises:

receiving second signaling from the base station, wherein the second signaling is used to instruct to activate a second cell that provides a service for the UE, wherein the second cell is the same as or different from the first cell; and processing, by the MAC entity, a second target resource by using a second target processing manner, wherein the second target resource is a resource in the second cell;

or, wherein in case that the first signaling is used to instruct the UE to switch from the source BWP to the target BWP, and the first target resource is the resource in the source BWP;

the processing, by the MAC entity in the UE, the first target resource by using the first target processing manner comprises:

processing, by the MAC entity, the resource in the source BWP by using the first target processing manner; and the method further comprises:

after the UE completes switching, receiving second signaling from the base station, wherein the second signaling is used to instruct to activate a resource in the target BWP; and processing, by the MAC entity, the second target resource by using the second target processing manner, wherein the second target resource is the resource in the target BWP.

2. The method according to claim 1, wherein the first target processing manner is releasing a resource, releasing configuration information of a resource, or suspending a resource; and the second target processing manner is activating a resource based on an activation command sent by the base station, or activating or restoring a resource based on configuration information sent by the base station.

3. The method according to claim 1, wherein the first target resource or the second target resource comprises at least one of a target downlink reference signal resource, a target uplink reference signal resource, and an uplink channel for sending a channel state information CSI report to the base station by the UE.

4. User equipment (UE), comprising a processor, a memory, and a computer program stored in the memory and executable by the processor, wherein the processor is configured to execute the computer program to cause the UE to implement a resource processing method, the method comprises:

receiving first signaling from a base station, wherein the first signaling is used to instruct to deactivate a first cell that provides a service for the UE, or used to instruct the UE to switch from a source bandwidth part (BWP) to a target BWP; and processing, by a media access control (MAC) entity in the UE, a first target resource by using a first target processing manner, wherein the first target resource is a resource in the first cell or the source BWP;

wherein in case that the first signaling is used to instruct to deactivate the first cell, and the first target resource is the resource in the first cell;

the processing, by the MAC entity in the UE, the first target resource by using the first target processing manner comprises:

processing, by the MAC entity, the resource in the first cell by using the first target processing manner; and the method further comprises:

receiving second signaling from the base station, wherein the second signaling is used to instruct to activate a second cell that provides a service for the UE, wherein the second cell is the same as or different from the first cell; and processing, by the MAC entity, a second target resource by using a second target processing manner, wherein the second target resource is a resource in the second cell;

or wherein in case that the first signaling is used to instruct the UE to switch from the source BWP to the target BWP, and the first target resource is the resource in the source BWP;

the processing, by the MAC entity in the UE, the first target resource by using the first target processing manner comprises:

processing, by the MAC entity, the resource in the source BWP by using the first target processing manner; and the method further comprises:

after the UE completes switching, receiving second signaling from the base station, wherein the second signaling is used to instruct to activate a resource in the target BWP; and processing, by the MAC entity, the second target resource by using the second target processing manner, wherein the second target resource is the resource in the target BWP.

5. The UE according to claim 4, wherein the first target processing manner is releasing a resource, releasing configuration information of a resource, or suspending a resource; and the second target processing manner is activating a resource based on an activation command sent by the base station, or activating or restoring a resource based on configuration information sent by the base station.

6. The UE according to claim 4, wherein the first target resource or the second target resource comprises at least one of a target downlink reference signal resource, a target uplink reference signal resource, and an uplink channel for sending a channel state information CSI report to the base station by the UE.

7. A non-transitory computer-readable storage medium, storing therein a computer program, wherein the computer program is configured to be executed by a processor to cause UE to implement a resource processing method, the method comprises:

receiving first signaling from a base station, wherein the first signaling is used to instruct to deactivate a first cell that provides a service for the UE, or used to instruct the UE to switch from a source bandwidth part (BWP) to a target BWP; and processing, by a media access control (MAC) entity in the UE, a first target resource by using a first target processing manner, wherein the first target resource is a resource in the first cell or the source BWP;

wherein in case that the first signaling is used to instruct to deactivate the first cell, and the first target resource is the resource in the first cell;

the processing, by the MAC entity in the UE, the first target resource by using the first target processing manner comprises:
processing, by the MAC entity, the resource in the first cell by using the first target processing manner; and
the method further comprises:
receiving second signaling from the base station, wherein the second signaling is used to instruct to activate a second cell that provides a service for the UE, wherein the second cell is the same as or different from the first cell; and
processing, by the MAC entity, a second target resource by using a second target processing manner, wherein the second target resource is a resource in the second cell;
or
wherein in case that the first signaling is used to instruct the UE to switch from the source BWP to the target BWP, and the first target resource is the resource in the source BWP;
the processing, by the MAC entity in the UE, the first target resource by using the first target processing manner comprises:
processing, by the MAC entity, the resource in the source BWP by using the first target processing manner; and the method further comprises:
after the UE completes switching, receiving second signaling from the base station, wherein the second signaling is used to instruct to activate a resource in the target BWP; and
processing, by the MAC entity, the second target resource by using the second target processing manner, wherein the second target resource is the resource in the target BWP.

8. The non-transitory computer-readable storage medium according to claim 7, wherein the first target processing manner is releasing a resource, releasing configuration information of a resource, or suspending a resource; and
the second target processing manner is activating a resource based on an activation command sent by the base station, or activating or restoring a resource based on configuration information sent by the base station.

9. The non-transitory computer-readable storage medium according to claim 7, wherein the first target resource or the second target resource comprises at least one of a target downlink reference signal resource, a target uplink reference signal resource, and an uplink channel for sending a channel state information CSI report to the base station by the UE.

* * * * *